United States Patent
Geller

(10) Patent No.: US 6,199,067 B1
(45) Date of Patent: Mar. 6, 2001

(54) SYSTEM AND METHOD FOR GENERATING PERSONALIZED USER PROFILES AND FOR UTILIZING THE GENERATED USER PROFILES TO PERFORM ADAPTIVE INTERNET SEARCHES

(75) Inventor: Ilya Geller, Brooklyn, NY (US)

(73) Assignee: Mightiest Logicon Unisearch, Inc., Brooklyn, NY (US)

(*) Notice: Subject to any disclaimer, the term of this patent is extended or adjusted under 35 U.S.C. 154(b) by 0 days.

(21) Appl. No.: 09/422,286

(22) Filed: Oct. 21, 1999

Related U.S. Application Data
(60) Provisional application No. 60/116,582, filed on Jan. 20, 1999.

(51) Int. Cl.[7] ....................................... G06F 17/30
(52) U.S. Cl. .......................... 707/10; 707/3; 707/5; 707/100; 704/4; 704/9; 704/247; 700/17
(58) Field of Search ..................... 707/1–5, 100, 707/10, 200; 704/1, 4, 9, 270.1, 247, 250; 382/181, 190, 209; 700/11, 17, 56, 83, 86; 369/13

(56) References Cited

U.S. PATENT DOCUMENTS

| | | | |
|---|---|---|---|
| 4,914,590 | * 4/1990 | Loatman et al. | 704/8 |
| 5,483,650 | * 1/1996 | Pedersen et al. | 707/2 |
| 5,696,962 | * 12/1997 | Kupice | 707/4 |

(List continued on next page.)

OTHER PUBLICATIONS

Helm, Richanr et al., "Integrating Information Retrieval and Domain Specific Approaches for Browsing and Retrieval in Object–Oriented Class Libraries," Conference proceedings on Object–Oriented programming systems, languages, and applications, May 1991. p.*

Maass, Henning, "Location–aware mobile applications based on dictionary services," Mobile Networks and Applications, vol. 3, Issue 2, Aug. 1998, pp. 157–173.*

Xu, Yaowu et al., "Hierarchical Content Description and Object Formation by Learning," Proceedings of the IEEE Workshop on Content–Based Access of Image and Video Libraries, (CBAIVL '99), Jun. 22, 1999, pp. 84–88, May 1991.*

Primary Examiner—Hosain T. Alam
Assistant Examiner—Shahid Alam
(74) Attorney, Agent, or Firm—Edward Etkin, Esq.

(57) ABSTRACT

A system and method for automatically generating personalized user profiles and for utilizing the generated profiles to perform adaptive Internet or computer data searches is provided. In accordance with the present invention, particular linguistic patterns and their frequency of recurrence are extracted from personal texts provided by the users of the system of the present invention and stored in a user profile data file such that the user profile data file is representative of the user's overall linguistic patterns and the frequencies of recurrence thereof. All documents in a remote computer system, such as the Internet, are likewise analyzed and their linguistic patterns and pattern frequencies are also extracted and stored in corresponding document profiles. When a search for particular data is initiated by the user, linguistic patterns are also extracted from a search string provided by the user into a search profile. The user profile is then cross matched with the search profile and the document profiles to determine whether any linguistic patterns match in all three profiles and to determine the magnitude of the match based on summation of respective frequencies of recurrence of the matching patterns. The documents with document profiles having the highest matching magnitudes are presented to the user as not only matching the subject of the search string, but also as corresponding to the user's cultural, educational, and social backgrounds as well as the user's psychological profile.

62 Claims, 8 Drawing Sheets

U.S. PATENT DOCUMENTS

| | | | |
|---|---|---|---|
| 5,822,748 | * 10/1998 | Cohen et al. | 7074/2 |
| 5,848,408 | * 12/1998 | Jakobsson et al. | 707/3 |
| 5,943,648 | * 8/1999 | Tel | 704/260 |
| 5,974,408 | * 10/1999 | Cohen et al. | 707/2 |
| 6,016,487 | * 1/2000 | Rioux et al. | 707/2 |
| 6,018,734 | * 1/2000 | Zhang et al. | 707/3 |
| 6,081,750 | * 6/2000 | Hoffberg et al. | 700/17 |

* cited by examiner

SYSTEM AND METHOD FOR GENERATING PERSONALIZED USER PROFILES AND FOR UTILIZING THE GENERATED USER PROFILES TO PERFORM ADAPTIVE INTERNET SEARCHES

RELATED APPLICATIONS

This application claims priority from U.S. Provisional Patent Application Ser. No. 60/116,582, entitled "Internet Search Vehicles" which was filed on Jan. 20, 1999.

FIELD OF THE INVENTION

The present invention relates generally to the computer data searches and more particularly to a system and method for automatically generating personalized user profiles and for utilizing the generated profiles to perform adaptive Internet or computer data searches.

BACKGROUND OF THE INVENTION

In recent years, computers have taken the world by storm. Today, most businesses entirely rely on computers to conduct daily operations. In the academic world, computers have become essential tools for learning, teaching and research. In homes, computers are used to perform daily tasks ranging from paying bills to playing games. The one unifying requirement for all computer applications is the ability of a user to utilize a computer to locate particular information or data desired by the user.

During the past few years, the quantity and diversity of information and services available over the public (e.g. Internet) and private (e.g. Intranet) local and wide area networks has grown substantially. In particular, the variety of information accessible through Internet-based services is growing rapidly both in terms of scope and depth. In simple terms, the Internet is a massive collection of individual computer networks operated by government, industry, academia, and private parties that are linked together to exchange information. While originally, the Internet was used mostly by scientists, the advent of the World Wide Web has brought the Internet into mainstream use. The World Wide Web (hereafter "WWW") is an international, virtual-network-based information service composed of Internet host computers that provide on-line information in a specific hypertext format. WWW host servers provide hypertext metalanguage (HTML) formatted documents using a hypertext transfer protocol (HTTP). Information on the WWW is accessed with a hypertext browser, such as the Netscape navigator or Microsoft Explorer. Web sites are collections of interconnected WWW documents.

Typically, users communicate with the Internet through a communication gateway that may be implemented and controlled by an Internet service provider (i.e. an ISP)—a company that offers a user access to the Internet and the WWW through a software application that controls communication between the user's computer and the communication gateway. The role of the ISP may also be taken directly by a particular organization that allows internet access to its employees or members. The user can access and navigate the WWW using a hypertext browser application residing on, and executed by, the user's computer.

No hierarchy exists in the WWW, and the same information may be found by many different approaches. Hypertext links in WWW HTML documents allow readers to move from one place in a document to another (or even between documents) as they want to. One of the advantages of WWW, is that there is no predetermined order that must be followed in navigating through various WWW documents. Readers can explore new sources of information by following links from place to place. Following links has been made as easy as clicking a mouse button on the link related to the subject a user wants to access. Each WWW document also has a unique uniform resource locator ("URL") that serves as an "address" that, when followed, leads the user to the document or file location on the WWW. Using the browser, the user can also mark and store "favorites"—URLs of particular WWW documents that interest the user such that the user can quickly and easily return to these documents in the future by selecting them from the favorites list in the browser.

Because of the vastness of the Internet and the WWW, locating specific information desired by the user can be very difficult. To facilitate search for information a number of "search engines" have been developed and implemented. A search engine is a software application that searches the Internet for web sites containing information on the subject in which the user is interested. These searches are accomplished in a variety of ways—all well-known in the art. Typically, a user first inputs a "search string" to the hypertext browser containing key words representative of the information desired by the user. The search engine then applies the search string to a previously constructed index of a multitude of web sites to locate a certain number of web sites having content that matches the user's search string.

The located web site URLs are then presented to the user in the order of relevance to the key words in the user's search string. For example, a user providing the key word PLANT would obtain an exhaustive list of all registered sites that refer to plants. This list, however would be so large that the user would want to limit this search. Depending on the search engine used, the user could limit the search by entering a combination of key words such as the following: PLANT AND FLOWER AND GARDEN. This would limit the search to only Internet sites that contain all three words. In addition, users could further limit the search by entering PLANT AND FLOWER AND GARDEN NOT TREE NOT ORCHID. The results from this search would be further limited to exclude sites in which trees and orchids are listed as keywords.

A number of approaches have been developed to improve the performance and accuracy of typical key word searches. For example, U.S. Pat. No. 5,845,278, issued to Kirsch, et. al, teaches approaches to establishing a quantitative basis for selecting client database sets (i.e. Internet documents or web sites) that include the use of comprehensive indexing strategies, ranking systems based on training queries, expert systems using rule-based deduction methodologies, and inference networks. These approaches were used to examine knowledge base descriptions of client document collections or databases.

However, the key word searching approaches utilized by previously known search engines suffer from a number of significant disadvantages. Most search systems are viewed as often ineffective in identifying the likely most relevant documents. Accordingly, the users are often presented with overwhelming amounts of information in response to their key words. Thus, using proper key word searching techniques becomes an art in itself—an art that is outside the capabilities of most Internet users.

Most importantly, typical key word and even more advanced searches only provide the user with search results that depend entirely on the search string entered by the user, without any regard to the user's cultural, educational, social backgrounds or the user's psychological profiles. The results returned by the search engines are tailored only to the search string provided by the user and not to the user's background. None of the previously known search engines tailor results of user's searches based on his or her background and unexpressed interests. For example, a twelve year old child using key word searches on the Internet for some information on computers may be presented with a multitude of documents that are far above the child's reading and educational level. In another example, a physician searching the Internet for information on a particular disease may be presented with dozens of web sites that contain very generic information, while the physician's "unexpressed" interest was to find web sites about the disease that are on his educational and professional level.

It would thus be desirable to provide a system and method for extracting and using linguistic patterns of textual data to assist a user in locating requested data that, in addition to matching the user's specific request, also corresponds to the user's professional, cultural, educational, and social backgrounds as well as to the user's psychological profile and thus addresses the user's "unexpressed" requests.

SUMMARY OF THE INVENTION

This invention relates to use of linguistic patterns of documents to assist a user in locating requested data that, in addition to matching the user's specific request, also corresponds to the user's cultural, educational, professional, and social backgrounds as well as to the user's psychological profile, and thus addresses the user's "unexpressed" requests. The present invention provides a system and method for automatically generating a personalized user profile based on linguistic patterns of documents provided by the user and for utilizing the generated profile to perform adaptive Internet or computer data searches.

The system of the present invention advantageously overcomes the drawbacks of previously known data searching techniques. As was noted earlier, typical key word and even more advanced searches only provide the user with search results that depend entirely on the search string entered by the user, without any regard to the user's cultural, educational, professional, and social backgrounds or the to user's psychological profile.

All texts composed by the user, or adopted by the user as favorite or inimical (such as a favorite book or short story), contain certain recurring linguistic patterns, or combinations of various parts of speech (nouns, verbs, adjectives, etc.) in sentences that reflect the user's cultural, educational, social backgrounds and the user's psychological profile. Research has shown that most people have readily identifiable linguistic patterns in their expression and that people with similar cultural, educational, and social backgrounds will have similar linguistic patterns. Furthermore, research has shown that such factors as psychological profile, life experience, profession, socioeconomic status, educational background, etc. contribute to determining the frequency of occurrences of particular linguistic patterns within the user's written expression.

In accordance with the present invention, particular linguistic patterns and their frequencies of occurrence are extracted from the texts provided by a user of the system of the present invention and stored in a user profile data file. The user profile data file is thus representative of the user's overall linguistic patterns and their respective frequencies. All documents in a remote computer system, such as the Internet, are likewise analyzed and their linguistic patterns and frequencies thereof also extracted and stored in corresponding document profiles. When a search for particular data is initiated by the user, linguistic patterns are also extracted from a search string provided by the user into a search profile. The user profile is then cross matched with the search profile and the document profiles to determine whether any linguistic patterns match in all three profiles and to determine the magnitude of the match based on summation of relative frequencies of matching patterns in the user profile and the document profile. The documents with document profiles having the highest matching magnitudes are presented to the user as not only matching the subject of the search string, but also as corresponding to the user's cultural, educational, and social backgrounds as well as the user's psychological profile. Thus, a world renowned physicist searching for information on quasars would be presented with very sophisticated physics documents that are oriented to wards his level of expertise.

It should be noted that the user's background and psychological characteristics are not evident directly from the linguistic patterns themselves or form their frequencies. Accordingly, the system of the present invention matches the user's linguistic patterns to the linguistic patterns of data requested by the user without extracting any actual information about the user's background and psychological characteristics from the user profile. Thus, the user's privacy is not impinged by the creation and retention of the user profile.

The profiling/search system includes a local computer system, connected to a remote computer network (e.g. the Internet) via a telecommunication link. The local computer system includes a control unit and related circuitry for controlling the operation of the local computer system and for executing application programs, a memory for temporarily storing control program instructions and variables during the execution of application programs by the control unit; a storage memory for long term storage of data and application programs; and input devices for accepting input from the user. The local computer system further includes: output devices for providing output data to the user and a communication device for transmitting to, and receiving data from, the remote computer system via the telecommunication link. The remote computer system includes a communication gateway connected to the telecommunication link, a remote data storage system for long term data storage, and a remote computer system control unit (hereinafter RCS control unit).

In summary, the system of the present invention operates in three separate independent stages, each stage being controlled by a particular control program executed by one of the local computer system and the remote computer system. In a first stage, a user profiling control program is executed to generate or update a user profile computer file representative of the user's linguistic patterns and the frequencies with which these patterns recur in texts submitted by the user and/or automatically acquired by the inventive system. The user is then invited to provide textual data composed by the user such as e-mail messages, memorandums, essays as well as documents composed by others that the user has adopted as "favorites", such as favorite web sites, short stories, etc. These textual documents are temporarily stored in a user data file. The inventive system also monitors the user's data searching and data browsing (e.g. Internet browsing) to automatically add additional textual information to the user data file. Once the user data file attains a sufficient size, or when other criteria for updating the user profile are met, the system executes a profile extraction subroutine to create/ update the user profile by extracting linguistic patters from the user data file.

During the profile extraction subroutine, the system retrieves individual textual documents from the user data file, and separates each document into sentences. The system then extracts a linguistic pattern, or a segment, from each sentence characterized by first identifying words in the sentence as being particular parts of speech (i.e. nouns, verbs, adjectives, etc.), and then selecting a predetermined combination of the identified parts of speech and storing this combination as a segment. In a preferred embodiment of the present invention, each segment comprises a triad of three parts of speech: noun-verb-adjective. The segment extraction process is repeated for all textual documents in the user data file. The system then groups identical segments together and determines their frequency of occurrence in the user profile. Thus, the resulting user profile contains the linguistic patterns from all texts submitted by the user (or automatically gathered by the system) and the frequencies with which those patterns recur within the texts.

In a second stage of the present invention, a data profiling control program is executed to generate data item profile computer files, representative of linguistic patterns and their respective frequencies, of all data items. The data items may include documents, web sites, and other textual data that may be subjected to a search by the user. A list of all data items and their respective data addresses (such as Internet URL addresses) is first provided to the system. The data item profile generation procedure is then performed for each data item in the list in a similar manner to the user-profiling procedure, except that data item address information is stored in each data item's profile. Thus, the resulting data item profile of each data item contain the data item address, the linguistic patterns of the data item and the frequencies with which those patterns recur therein.

In a third stage of the present invention, the system executes a data searching program that enables a user to utilize the system to perform advanced searches for desired data files, such that the data files returned as search results correspond to the user's social, educational, and cultural backgrounds and to the user's psychological profile. The search program is initiated when the user provides a search string representative of data requested by the user to the system. The system then creates a search profile representative of linguistic patterns in the search string in a similar manner to the user-profiling procedure, except that frequencies of recurring segments are not recorded in the search profile. Optionally, the system expands the search profile by generating additional segments that contain synonyms of the parts of speech in the existing segments already in the search profile, and storing the additional segments therein.

After the search profile is complete, the system retrieves the user profile of the user performing the search and compares the segments stored in the user profile with the segments stored in the search profile to determine a number of matches between various segments in each of the profiles and then, for each matching segment records the frequency with which the matching segment recurs within the user profile. The system then applies the original search string to a standard match engine to obtain a list of data item addresses that potentially match the user's search requirements and then retrieves the data item profiles corresponding to the data item addresses on the list. This procedure is optional but is recommended because a direct linguistic pattern search over all data items stored on the remote computer system can be very time consuming given the modern computing and data transfer technologies.

The system then compares, for each data item profile, the segments stored in the data item profile with the segments stored in the search profile to determine a number of matches between various segments in each of the profiles and then, for each matching segment records the frequency with which the matching segment recurs within the data item profile. A match value is then determined by the system for each segment in the data item profile that also appears in the search profile and in the user profile, by adding the frequency of the segment's occurrence in the data item profile to the frequency of the segment's occurrence in the user profile. Finally, the system computes a final value for each data item profile by adding together the match values of all matching segments in each data item. The final value is representative of the degree to which the linguistic pattern of the data item matches the linguistic pattern of the user in light of the linguistic pattern and subject matter of the search string. The data items, corresponding to data item profiles having the highest final values, are then retrieved by the system. The system then presents the user with several data items having the highest final values, starting with the data item with the highest final value.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote elements throughout the several views.

DETAILED DESCRIPTION OF PREFERRED EMBODIMENTS

Although the present invention is described with reference to interfacing a local computer workstation with the Internet, it should be understood that the system and method of present invention may be applied, without departing from the spirit of the invention, to any arrangement where the local computer workstation is connected via a telecommunication link to a remote computer system such as workstation or computer network, where the remote computer system may range from a single computer server workstation to a local area or distributed network. Furthermore it should be understood that the system and method of present invention may be applied, without departing from the spirit of the invention, to a self contained single computer workstation having long-term data storage. Finally, it should be noted that the system and method of the present invention are completely language independent and may thus be applied and utilized with any language.

Figure 1:
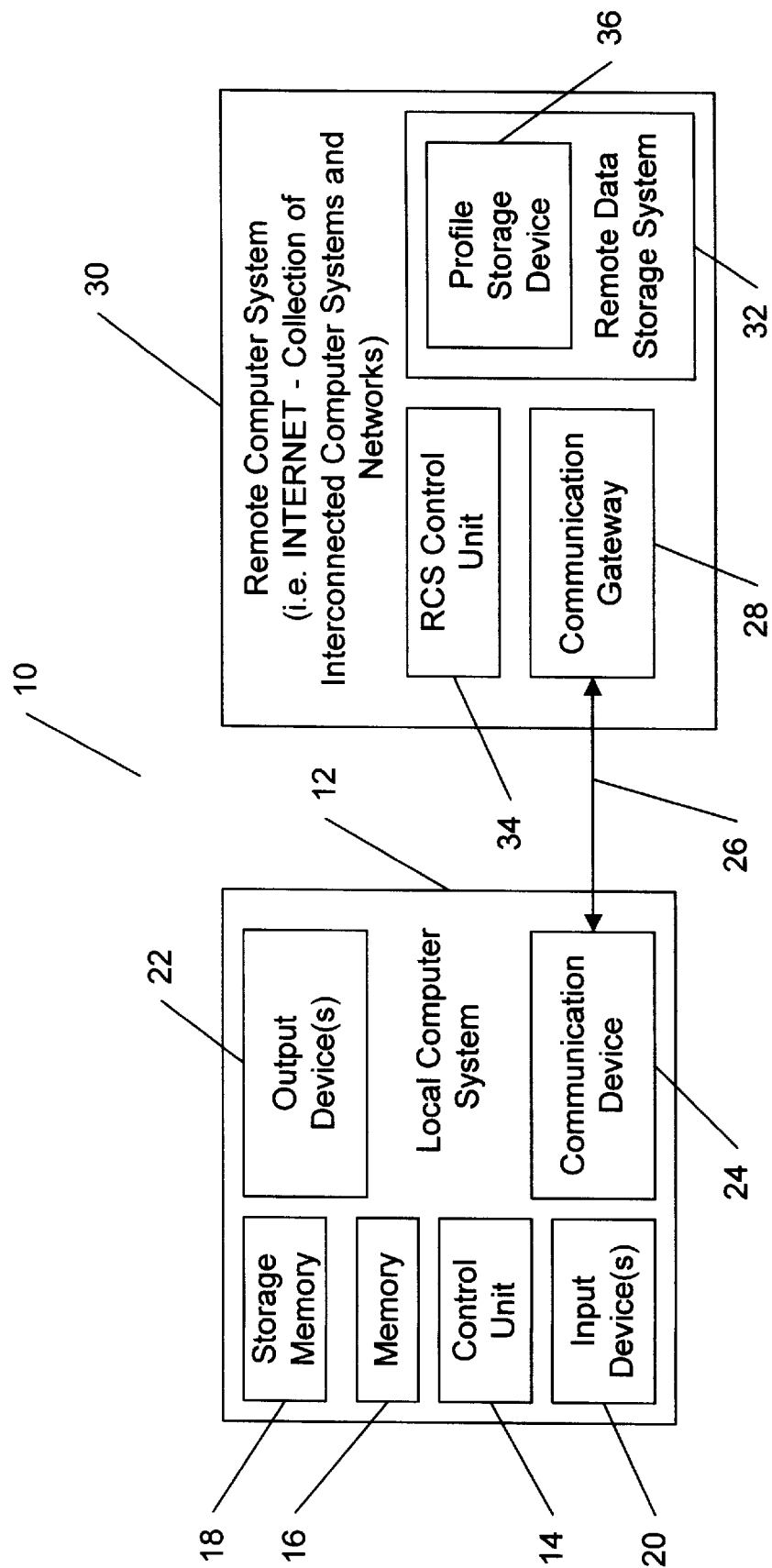
FIG. 1 is a schematic block diagram of a profiling/search system for automatically generating personalized user profiles and for utilizing the generated profiles to perform adaptive Internet or computer data searches.

Referring initially to FIG. 1, a profiling/search system 10 for automatically generating personalized user profiles and for utilizing the generated profiles to perform adaptive Internet or computer data searches is shown. As shown, the profiling/search system 10 includes a local computer system 12, connected to a remote computer network 30 via a telecommunication link 26. The local computer system 12 includes a control unit 14, such as a CPU and related circuitry for controlling the operation of the local computer system 12 and for executing application programs, a memory 16, such as random access memory, for temporarily storing control program instructions and variables during the execution of application programs by the control unit 14; a storage memory 18, such as flash memory or a disk drive for long term storage of data and application programs; and input device(s) 20 for accepting input from the user, that include at least one of the following input devices: a keyboard, a selection device (i.e. mouse, trackball, or touchpad), and a voice recognition device with speech to text capabilities.

The local computer system 12 further includes: output device(s) 22 for providing output data to the user, that include at least one of the following output devices: a display unit such as a CRT monitor or flat panel display, a printer, and a text to speech device with sound output capabilities; and a communication device 24 for transmitting to, and receiving data from, the remote computer system 30 via the telecommunication link 26, such as a modem or other telecommunication device. The telecommunication link 26 may be a standard telephone line, a DSL line, a high speed data transmission such as a T1 or T3 line, or a wireless telecommunication (i.e. cellular or radio) link. The local computer system 12 may be a generally conventional desktop personal computer, an informational kiosk, or a portable computer such as a laptop or a personal digital assistant (PDA).

The remote computer system 30 may be any remote computer system such as a single computer server or a network of interconnected computer systems, such as a local area or a wide area network. The remote computer system 30 includes a communication gateway 28, such as a modem and/or a network router connected to the telecommunication link 26; a remote data storage system 32 for long term data storage, and a remote computer system control unit 34 (hereinafter RCS control unit 34), such as a single CPU and associated devices, when the remote computer system 30 is a single computer server, or a set of independent CPUs and associated devices when the remote computer system 30 is a network of interconnected computer systems. The remote data storage system 32 may be a single data storage device, such as a disk drive, or a distributed data storage system over a plurality of separate interconnected computer systems each having individual data storage units (not shown).

In an embodiment of the present invention depicted in FIG. 1, the remote computer system 30 is preferably the Internet (hereinafter, the remote computer system 30 is interchangeably referred to as the Internet 30). Before describing the present invention in greater detail, it is helpful to briefly describe the Internet and related concepts. Simply stated, the Internet is a massive collection of individual networks operated by government, industry, academia, and private parties computers that are linked together to exchange information. While originally, the Internet was used mostly by scientists, the advent of the World Wide Web has brought the Internet into mainstream use. The World Wide Web (hereafter "WWW") is an international, virtual-network-based information service composed of Internet host computers that provide on-line information in a specific hypertext format. WWW host servers provide hypertext metalanguage (HTML) formatted documents using a hypertext transfer protocol (HTTP). Information on the WWW is accessed with a hypertext browser such as the Netscape navigator or Microsoft Explorer. Web sites are collections of interconnected WWW documents.

Assuming the remote computer system 30 is the Internet, certain functional explanation is necessary for the communication gateway 28, the remote data storage system 32, and the RCS control unit 34. The communication gateway 28 may be implemented and controlled by an Internet service provider (i.e. an ISP)—a company that offers the user of the local computer system 12 access to the Internet 30 and the WWW through a software application stored in storage memory 18 that controls communication between the communication device 24 and the communication gateway 28. Typically, the user can access and navigate the WWW using a hypertext browser application residing on the local computer system 12. The remote data storage system 32 is not a single device, but is representative of the storage devices that are used by the multitude of Internet host computers and networks (not shown). The RCS control unit 34 is representative of a plurality of control units of the multitude of Internet host computers and networks (not shown).

No hierarchy exists in the WWW, and the same information may be found by many different approaches. Hypertext links in WWW HTML documents allow readers to move from one place in a document to another (or even between documents) as they want to. One of the advantages of WWW is that there is no predetermined order that must be followed in navigating through various WWW documents. Readers can explore new sources of information by linking from place to place. This linking has been made as easy as clicking a mouse button on the subject a user wants to access. Each WWW document also has a unique uniform resource locator ("URL") that serves as an "address" that, when followed leads the user to the document or files location on the WWW. Using the browser, the user can also mark and store "favorites"—URLs of particular WWW documents that interest the user such that the user can quickly and easily return to these documents in the future by selecting them from the favorites list in the browser.

Because of the vastness of the Internet and the WWW, locating specific information desired by the user can be very difficult. To facilitate search for information a number of "search engines" have been developed and implemented. A search engine is a software application that searches the Internet for web sites containing information on the subject in which the user is interested. These searches are accomplished in a variety of ways—all well-known in the art. Typically, a user first inputs a "search string" to the hypertext browser containing key words representative of the information desired by the user. The search engine then applies the search string to a previously constructed index of a multitude of web sites to locate a certain number of web sites having content that matches the user's search string. The located web site URLs are then presented to the user in the order of relevance to the key words in the user's search string.

However, as was noted earlier, typical key word and even more advanced searches only provide the user with search results that depend entirely on the search string entered by the user, without any regard to the user's cultural, educational, social backgrounds or the user's psychological profiles. For example, a twelve year old child using key word searches on the Internet for some information on computers may be presented with a multitude of documents that are far above the child's reading and educational level.

All texts composed by the user, or adopted by the user as favorite or inimical (such as a favorite book or short story), contain certain linguistic patterns, or combinations of various parts of speech (nouns, verbs, adjectives, etc.) in sentences that reflect the user's cultural, educational, social backgrounds and the user's psychological profile. Research has shown that most people have readily identifiable linguistic patterns in their expression and that people with similar cultural, educational, and social backgrounds will have similar recurring linguistic patterns. In summary, in accordance with the present invention, particular linguistic patterns and their frequencies of recurrence are extracted from the texts provided by the users of the system of the present invention and stored in a user profile data file. The user profile data file is thus representative of the user's overall linguistic patterns. All documents in a remote computer system, such as the Internet, are likewise analyzed and their linguistic patterns and respective recurrence frequencies also extracted and stored in corresponding document profiles. When a search for particular data is initiated by the user, linguistic patterns are also extracted from a search string provided by the user into a search profile. The user profile is then cross matched with the search profile and the document profiles to determine whether any linguistic patterns match in all three profiles and to determine the magnitude of the match based on relative recurrence frequencies of matching user and document linguistic patterns. The documents with document profiles having the highest matching magnitudes are presented to the user as not only matching the subject of the search string, but also as corresponding to the user's cultural, educational, and social backgrounds as well as the user's psychological profile. Thus, a world renowned physicist searching for information on quasars would be presented with very sophisticated physics documents that are oriented to wards his level of expertise.

Figure 2:
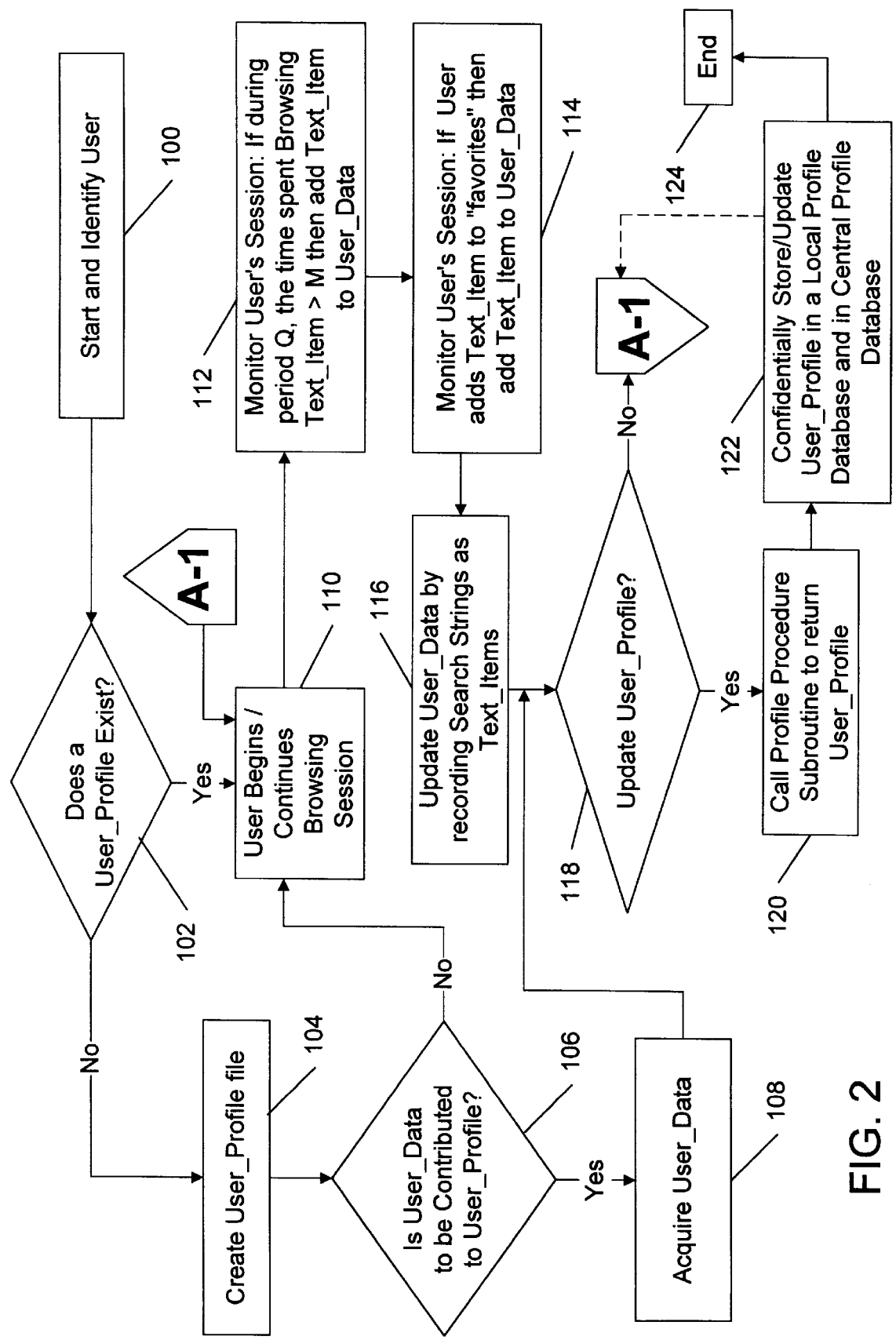
FIG. 2 is a logic flow diagram representative of a user profiling control program executed by the profiling/search system of FIG. 1 in accordance with the present invention.

Referring now to FIG. 2, a logic flow diagram representing a user profiling control program for the control unit 14 of FIG. 1 in accordance with a preferred embodiment of the present invention is shown. As a matter of design choice, one or more of the steps of the user profiling control program may be executed by the RCS control unit 34 without departing from the spirit of the present invention. The purpose of the user profiling control program is to generate or update a User_Profile computer file representative of the user's linguistic patterns (and thus representative of the user's social, educational, and cultural background, as well as of the user's psychological profile).

The user profiling control program begins at a step 100 where the user's identity is verified by the control unit 14, for example by asking the user to provide a password or some form of a biometric identifier such as a fingerprint, a voice sample or a retinal image to the input device 20. At a test 102, the control unit 14 determines whether a User_ Profile has been previously generated for the user. Because a particular local computer system 12 may be used by multiple users, a variety of User_Profiles, one for each individual user, may be stored in the storage memory 18 in a local profile database. In addition to, or instead of, the local profile database, User_Profiles may be stored in a remote central profile database located in a profile storage device 36, such as a storage memory device attached to a specific Internet host computer, in the remote data storage system 32. Storing User_Profiles in the central profile database is advantageous because a user may be able to utilize his or her User_Profile even when accessing the remote computer system 30 from a computer other than the local computer system 12.

Thus, at the test 102, the control unit 14 searches the storage memory 18 to determine whether the local profile database contains a User_Profile that has been previously created for the user that has been identified at the step 100. In addition, since the User_Profile may be also stored in the central profile database in the profile storage device 36, at the test 102 the control unit 14 also searches the profile storage device 36 to determine whether the central profile database contains a User_Profile that has been previously created for the user. Optionally, if User_Profiles are stored both in a local profile database and the central profile database, the control unit 14 ensures that both User_Profiles are identical to one another, by replacing an older User_ Profile with a newer one if the User_Profiles in each of the databases differ from one another.

If at the test 102, the control unit 14 determines that a User_Profile for the identified user does not exist, then a new empty User_Profile is created at a step 104 and stored in the storage memory 18. At a test 106, the control unit 14 queries the user whether the user wishes to voluntarily contribute User_Data to the User_Profile. User_Data may be of two types—personal textual data generated by the user, and favorite textual data generated by a source other that the user. Personal textual data preferably consists of any documents created and composed by the user and may include, but is not limited to: books, articles, memorandums, essays, compositions, e-mails, reports, and web sites. Favorite textual data preferably consists of any documents that were created by a source other than the user but that the user has adopted as being particularly interesting, fascinating, or appealing, and may include, but is not limited to books, articles, memorandums, essays, compositions, e-mails, reports, and web sites. Furthermore, a user with an existing User_Profile may initiate the user profiling control program from the test 106 when the user wishes to update his or her profile by supplying additional User_Data to the control unit 14.

At the test 106, the user preferably instructs the control unit 14 to acquire all of personal textual data stored in the storage memory 18, for example by scanning the user's "sent" e-mail folders, document directories and any directories with any other documents that the user identifies as personal textual data. Alternately, the user may identify specific personal documents to be used as personal textual items. The user may also instruct the control unit 14 to acquire selected favorite textual data from documents identified by the user as "favorite" that are stored in the storage memory 18, or instruct the control unit 14 to retrieve WWW documents from the remote data storage system 32 of the Internet 30 in accordance with the URLs stored in the "favorites" section of the browser. In addition, the user may identify additional WWW documents to the control unit 14 as favorite textual data, such that the control unit 14 retrieves these additional documents and adds them to User_Data. Furthermore, the user may specify, to the control unit 14, certain long texts such as full text classical books stored on the Internet 30 as being favorite textual data. For example, the user may regard Homer's Illiad as his favorite book and thus identify it as favorite textual data. Both personal and favorite textual data are stored in User_Data as Text_Items—i.e. individual text documents.

User_Data is preferably structured as a computer data file that contains a number of sequential individual Text_Items that are separated from one another by some sort of a delimiter readily identifiable by the control unit 14. The quantity and quality of User_Data provided by the user is directly proportional to the quality, accuracy and usefulness of the User_Profile that will be based on the User_Data. Thus, the user is encouraged to provide as much personal and favorite textual data as possible. It should be noted that although the user may submit very personal texts as personal textual data to the control unit 14, as will be explained below in connection with FIG. 3, the User_Profile does not contain any private information about the user nor does it contain any textual excerpts from the user's private texts. Instead, as was previously explained, the control unit 14 extracts linguistic patterns from the texts rather than the actual information conveyed by the texts. Of course, in some circumstances the user may not have any personal or favorite textual data stored in the storage memory 18, for example if the local computer system 12 is brand new. Also, it is possible that the user may not have enough knowledge of the Internet to specify any favorite web sites or on-line documents. In both cases the user may be unable to provide any User_Data to the control unit 14. It should be noted that after the completion of the user profiling control program, the User_Data file is purged by the control unit 14.

If the control unit 14 determines at the test 106 that User_Data is to be contributed by the user, then at a step 108, the control unit 14 acquires User_Data, including personal and favorite Text_Items identified by the user at the test 106, from the storage memory 18 and/or from the remote data storage system 32 of the Internet 30. The control unit 14 then proceeds to a test 118. If, on the other hand, the control unit 14 determines at the test 106 that User_Data is not to be contributed (i.e., for example if the user does not have any data stored in the storage memory 18), then the control unit 14 proceeds to a step 110.

Returning to the test 102, if at the test 102, the control unit 14 determines that a User_Profile for the identified user already exists, then at the step 110 the user begins an Internet browsing session using a hypertext browser (such as Netscape or Explorer). During a browsing session, the user may navigate through a variety of web sites, HTML documents or other types of Text_Items. In an alternate embodiment of the present invention, when the remote computer system 30 is not the Internet, at the step 110 the user may begin using any software application that may be installed on the local computer system 12 and that is configured for searching for data and/or for navigating through a plurality of data files, i.e., Text_Items.

It should be noted that steps 112–116 may be performed by the control unit 14 substantially simultaneously. Furthermore, it should be noted that steps 112 and 114 are optional. At a step 112, the control unit 14 begins to monitor the user's browsing session initiated at the step 110 for the entire duration of the browsing session. If the user spends more than a pre-determined "M" period of time viewing a particular Text_Item, then the control unit 14 adds the Text_Item to User_Data—in effect by spending more that a particular period of time browsing a Text_Item, the user has adopted the Text_Item as one of the user's favorite textual items. Preferably, the control unit 14 accumulates a total duration of time Q that each Text_Item is viewed by the user over a predetermined period P. If during the period P, Q exceeds the period M, then the control unit 14 adds the Text_Item to User_Data. The time period P is preferably 24 hours, but may be as long as one week, or longer. The period M may be one or more hours and is preferably set in accordance with the period P. Thus, for example, if P is set to 24 hours, M is preferably set between one to two hours, while if P is set to one week M may be set to five to ten hours. To illustrate the operation of the step 112, assuming P is set to 24 hours and M is set to two hours, if the user views a particular Text_Item for a total of two or more hours (viewing time Q is greater than M) during the 24 hour period, then the control unit 14 adds the viewed Text_Item to User_Data.

At a step 114, the control unit 14 monitors the operation of the browser, such that when the user adds any Text_Item to the browser's "favorites" section, the control unit 14 automatically adds the Text_Item to User_Data. For example, if the user visits a web site and the user becomes interested enough in the site's material that the user adds the web site (Text_Item) to the favorites section of the browser, the control unit 14 adds the Text_Item to User_Data.

At a step 116, the control unit 14 monitors the operation of the browser to automatically add, as Text_Items to User_Data, any search strings that the user inputs into the browser. Thus, for example, when the user utilizes the browser's search capabilities to search for "computer that mimics human thinking process and artificial intelligence and neural network", the control unit 14 adds this search string to User_Data as a Text_Item.

At the optional test 118, the control unit 14 determines if the User_Profile should be updated. If the User_Profile file was created at the step 104, then a determination of whether sufficient User_Data has been accumulated at the step 108 or the steps 112–116 may be required. Preferably, the control unit 14 counts the total number of words in all Text_Items in User_Data and compares the total to a predetermined word count threshold. If the total number of words in User_Data exceeds the word count threshold, then User_Data is sufficient for updating the User_Profile, and the control unit 14 proceeds to the step 120. On the other hand, if the total number of words in User_Data is below the word count threshold, then User_Data is insufficient for updating of the initial User_Profile. The control unit 14 then returns to the step 110 where the user may continue the browsing session so that the control unit 14 may continue to accumulate additional Text_Items for User_Data at the steps 112 to 116.

This approach is advantageous because it ensures that the User_Profile is based on sufficient linguistic data provided by the user before its utilization. If a new User_Profile based on insufficient linguistic data is used it may provide inaccurate results. The word count threshold may be selected as a matter of design choice, keeping in mind that the magnitude of User_Data is proportional to the accuracy of the User_Profile derived from User_Data. For example, the threshold total may be set between 1000 and 3000 words. Alternatively, instead of counting the total number of words in User_Data, the control unit 14 may count a total of all Text_Items in User_Data and compare that total to another threshold. For example, the threshold may be set to twenty Text_Items.

If, at the test 102, the control unit 14 determined that a User_Profile for the user already exists, then the control unit 14 determines whether the existing User_Profile should be updated. If frequent updating of the existing User_Profile is undesirable (for example to conserve computing resources), then an update criteria for updating the User_Profile may be set as matter of design choice. The update criteria may include, but is not limited to: a particular period of time between updates, for example updating no more than once per 24 hours, or addition of a particular number of words to User_Data during the steps 112 to 116 and/or the step 108 if the user voluntarily contributed Text_Items to User_Data to update the existing User_Profile. For example, this particular number of words may be 500 or more. If the update criteria is not met, then the control unit 14 returns to the step 110. If, on the other hand frequent updating of the existing User_Profile is desired or if the update criteria has been met, then the control unit 14 proceeds to the step 120.

At the step 120, the control unit 14 performs a profile procedure subroutine to update the User_Profile. Subroutines are known in the computer programming art as functions designed to perform specific tasks requested by a main control program. As a matter of design choice, one or more of the steps of the profile procedure subroutine may be executed by the RCS control unit 34 without departing from the spirit of the present invention. One of the advantages of using subroutines is that two or more programs can use the same subroutine to perform a particular function. Modern programming techniques also encompass programmable "objects" which function similarly to subroutines. The main advantage of programmable "objects" is that once an "object" is developed to perform a particular function, it may be used in any program wishing to use that function. The purpose of the profile procedure subroutine is to compose/update the User_Profile by analyzing and extracting linguistic patterns from the Text_Items in User_Data and adding the extracted linguistic patterns to the User_Profile.

Figure 3:
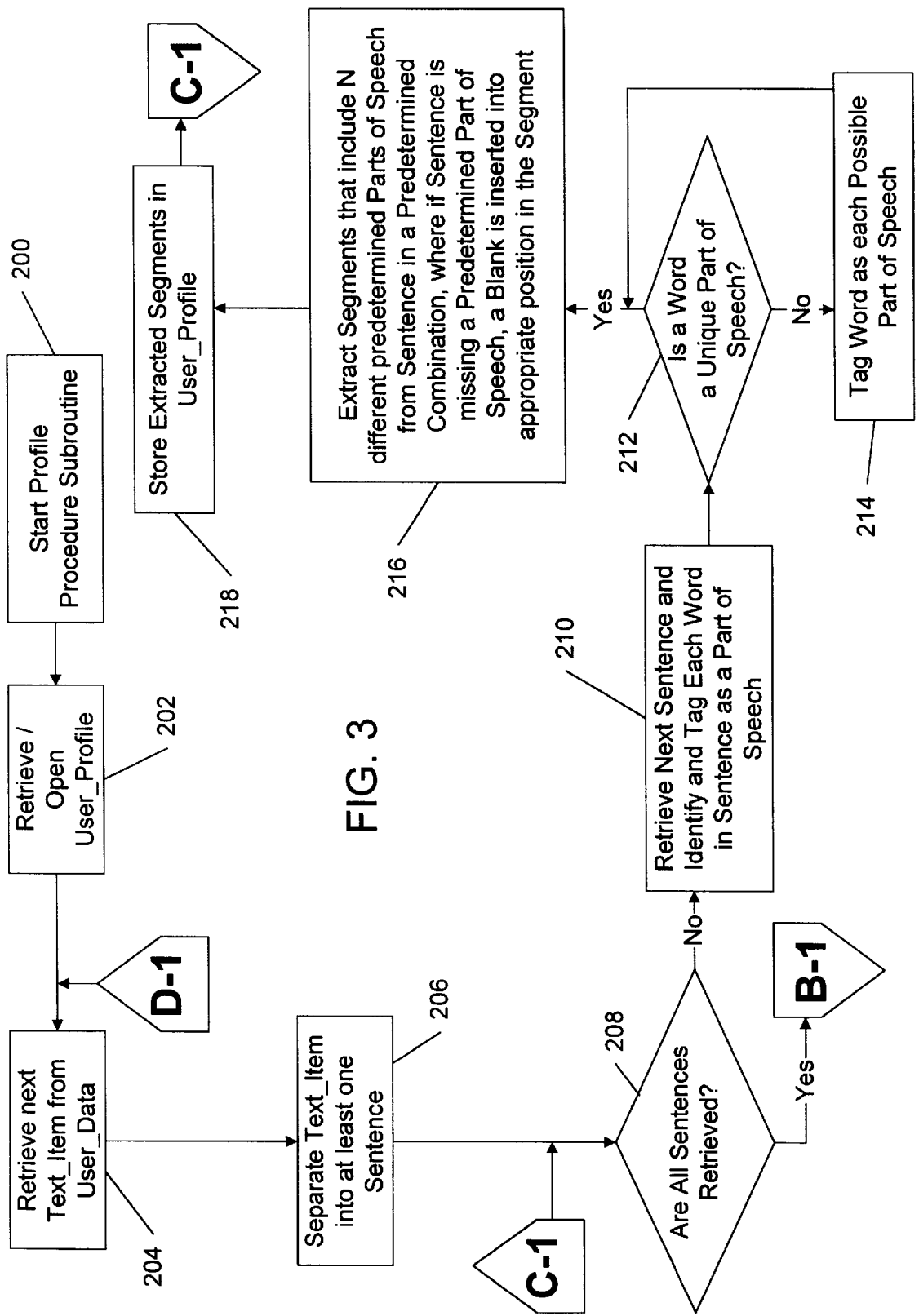
FIGS. 3 to 4 are logic flow diagrams representative of a profile procedure subroutine program executed by the profiling/search system of FIG. 1 in accordance with the present invention.

Referring now to FIG. 3, the profile procedure subroutine begins at a step 200 and proceeds to a step 202 where the control unit 14 retrieves and opens the User_Profile from the storage memory 18. At a step 204, the control unit 14 retrieves the first Text_Item from User_Data. At a step 206, the control unit 14 separates the retrieved Text_Item into at least one separate "sentence"—a collection of words from which linguistic patterns will be extracted to form the User_Profile. Most Text_Items are documents that consist of a plurality of typical grammatical sentences separated by "end of sentence" (hereinafter "EOS") punctuation marks, such as periods, colons, and exclamation and question marks. Thus, the control unit 14 can readily separate a typical Text_Item into a number of separate sentences by identifying each separate sentence as a set of words ending in an EOS punctuation mark.

Other Text_Items, such as search strings, may not have any EOS punctuation marks and may be of significant length. Furthermore, certain compound sentences, such as patent claims, may contain multiple clauses and may also be of significant length. Preferably, a maximum sentence word count is defined as L as a matter of design choice. For example, L may be set to fifty words. The control unit 14 analyzes the Text_Item and counts words until a EOS punctuation is reached; if the word count reaches L and an EOS punctuation mark is not reached, then the control unit 14 identifies the L words as a sentence (i.e. as if an EOS punctuation mark was actually reached at L words) and begins a new word count for the next sentence. For example if the Text_Item is a 158 word search string, and L is set to fifty words, then this Text_Item will be separated into four sentences with fifty words in each of the first three sentences and eight words in the fourth sentence. If an EOS punctuation mark is reached before the word count reaches L, then the control unit 14 first identifies the words before the EOS punctuation mark as a sentence and then begins a new word count for the next sentence.

Figure 4:
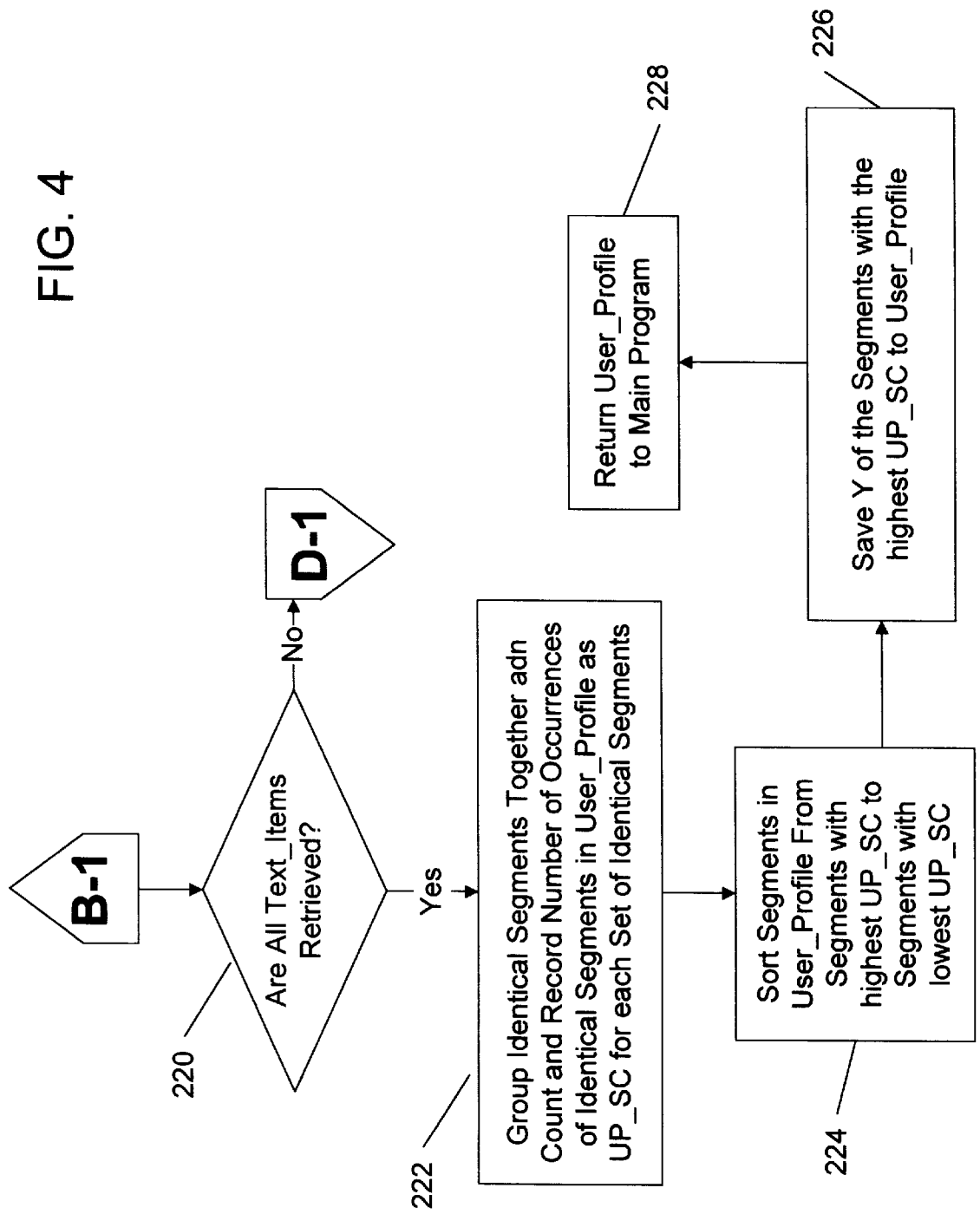

At a test 208, the control unit 14 determines whether all sentences from the Text_Item retrieved at the step 204, have been retrieved. Because sentences are retrieved at a later step 210, during a first iteration of the test 208, where no sentences have been retrieved by the control unit 14 thus far, the control unit 14 proceeds directly to the step 210. During subsequent iterations, if all sentences have been retrieved from the current Text_Item, then the control unit 14 proceeds to a test 220 (FIG. 4). If, on the other hand, not all sentences have been retrieved, then the control unit 14 proceeds to the step 210.

At the step 210, the control unit 14 retrieves the first sentence identified at the step 206 (or, during subsequent iteration of this step, retrieves the next sentence). The control unit 14, then identifies and tags each word in the retrieved sentence as a particular part of speech (hereinafter "POS")—i.e. a noun, pronoun, verb, etc. To simplify further processing of the POS, after tagging the POS, the control unit 14 automatically brings all verbs to simple present tense, and brings all nouns to singular form. For example in a sentence "Joe walked to his beautiful home", the control unit 14 would tag "Joe" and "home" as nouns, "walk" as a verb, "to" as a preposition, "his" as a pronoun, and "beautiful" as an adjective. However, since for the purpose of performing data searches only a few POS are necessary, the control unit 14 preferably only identifies and tags certain predetermined POS such as nouns, verbs and adjectives.

This procedure is performed in accordance with standardized rules of grammar. Automatic identification of parts of speech in a sentence is well known in the art and need not be described herein. For example, many conventional word processors unitize grammar checking functions that are capable if identifying parts of speech in a sentence. The particular POS that are identified and tagged by the control unit 14 may include, but are not limited to: noun, pronoun, verb, adverb, adjective, gerund, propositions, conjunctions and interjections. To simplify further processing of the POS, during the step 210, after tagging the POS the control unit 14 automatically brings all verbs to simple present tense, and brings all nouns to singular.

At a test 212, the control unit 14 analyzes each word in the sentence and determines of it is a unique POS. Certain words may be used as different parts of speech, for example, the word "police" may be used both as a noun and as a verb. This determination may be done with reference to a dictionary stored in the storage memory 18 or in the remote data storage system 32. If the word is a unique POS, then the control unit 14 proceeds to a step 216. Otherwise, if the word is not a unique POS, then the control unit 14 proceeds to a step 214, where the control unit 14 tags the word with multiple tags in accordance with its possible POS usage. For example, the word "police" would be tagged as a noun and as a verb.

At the step 216, the control unit 14 extracts one or more segments from the sentence retrieved at the step 210 that are representative of the linguistic patterns of the sentence. A segment consists of one or more predetermined types of POS arranged in a predetermined order. The number, the type, and the order of POS in a segment may be selected as a matter of design choice, depending on the purpose for which the User_Profile will be utilized. For the purpose of performing data searches, preferably each segment is a triad (i.e. N=3) of three POS arranged as follows: noun-verb-adjective. Thus, in accordance with this embodiment, previously, at the step 210, the control unit 14 only identifies and tags nouns, verbs and adjectives, and at the step 216 the control unit 14 extracts noun-verb-adjective segments from each sentence.

Alternately, the following other arrangements may be used for the segment if desired: noun-adverb-adjective; gerund-verb-adjective; gerund-adverb-adjective; pronoun-verb-adjective; pronoun-adverb-adjective. Accordingly, the appropriate POS used in the segment would need to have been previously tagged by the control unit 14 at the step 210. Furthermore, in an alternate embodiment of the present invention, the segments may consist of one or more POS.

Because a sentence may contain multiple POS of the same type, i.e. two nouns, several segments may potentially be composed by the control unit 14 from a single sentence. Thus, in accordance with the present invention, the control unit 14 extracts every possible noun-verb-adjective segment from the sentence. For example, if the sentence is "Joe walked to his beautiful new house", then the control unit 14 would extract the following segments therefrom:

Joe-walk-beautiful

Joe-walk-new house-walk-beautiful house-walk-new

However, if a particular sentence is missing one of the three POS (noun, verb, adjective) required in the segment, then the control unit 14 inserts a "blank" flag (for example the characters "◇") into the position of the missing POS. For example, if the sentence is "Joe walked to his house", then the control unit 14 would extract the following segments therefrom:

Joe-walk-◇ house-walk-◇

The blank flag "◇" was inserted by the control unit 14 into the position of the adjective POS that was not present in the sentence.

At a step 218, the control unit 14 temporarily stores all segments extracted at the step 216 in the User_Profile and then returns to the test 208.

Referring now to FIG. 3, at the test 220, the control unit 14 determines if all Text_Items have been retrieved from User_Data. If all Text_Items have not been retrieved, then the control unit 14 returns to the step 204 where the control unit 14 retrieves the next Text_Item. Otherwise, if the control unit 14 determines that all Text_Items have been retrieved from User_Data, then the control unit 14 proceeds to a step 222.

Thus, in summary, during steps 204 to 220, the control unit 14 retrieves all Text_Items from User_Data, splits each Text_Item into sentences, analyzes each sentence to extract segments representative of the sentence's linguistic patterns and stores the extracted segments in User_Profile.

At the step 222, the control unit 14 groups identical segments together into sets, counts the occurrence of identical segments in each set, and then records the number of identical segments in each set in User_Profile as User_Profile segment count (hereinafter "UP_SC") next to each set of identical segments. For example, if the segment "computer-execute-fast" appears twenty seven times in User_Profile, the UP_SC for that segment would be recorded next to that segment as "27". If the User_Profile already contains an identical segment set with an existing UP_SC, then the UP_SC determined at the step 222 is added to the existing UP_SC. For example, if the User_Profile already contains the segment set "instruction-execute-fast" with UP_SC of 15, and at the step 222 the control unit 14 determines that five such segments were extracted from User_Data during the steps 204 to 220, then the control unit 14 adds the new UP_SC of 5 to the existing UP_SC of 15 and records the new UP_SC of 20 next to the segment set "instruction-execute-fast". A high UP_SC for a segment is indicative of the relative importance of the segment as a representation of the user's linguistic pattern.

At a step 224, the control unit 14 sorts the identical segment groups in the User_Profile from the identical segment group with the highest UP_SC to the segment group with the lowest UP_SC. Thus, after the step 224, the User_Profile may look as follows:

| Segment | UP SC |
|---|---|
| computer-execute-fast | 27 |
| instruction-execute-fast | 20 |
| : : : | : |
| Joe-walk-<> | 5 |
| police-follow-vigilant | 1 |

The number of different segment sets that may be stored in the User_Profile is practically limited only by the sizes of the storage memory 18 and the remote data storage system 32, and the computing capabilities of the control unit 14 or of the RCS control unit 34. However, experimentation has shown that a very large number of segment sets in the User_Profile offers diminishing returns as balanced against the storage requirements for the User_Profile and the computing power required for the control unit 14 in order to effectively work with the User_Profile. Thus, preferably only a certain amount of segment sets with the highest UP_SC should be stored in the User_Profile. As a result, at a step 226, the control unit 14 saves only Y of the segments having the highest UP_SCs to the User_Profile, deleting all the remaining segments. For example, Y may be set to 5000, such that only 5000 of the most commonly occurring segments are saved by the control unit 14 to the User_Profile. Alternatively, Y% of the most commonly occurring segments may be saved to the User_Profile. For example, if Y is set to 20, the control unit 14 may save the top 20% of the segments with the highest UP_SCs.

At a step 228, the control unit 14 returns the updated User_Profile to user profiling control program (FIG. 2). Returning now to FIG. 2, at a step 122, the control unit 14 stores the updated User_Profile in at least one of the local profile database in the storage memory 18 and the central profile database in the profile storage device 36. Preferably, the User_Profile is stored "confidentially"—i.e. encrypted and protected by a password or by other access control means such as biometrics (e.g. a fingerprint scan, voice pattern matching, etc.) such that only the user can access and update his or her User_Profile. The control unit 14 then ends user profiling control program at a step 124, or optionally returns to the step 110, where the user can continue the browsing session.

Figure 5:
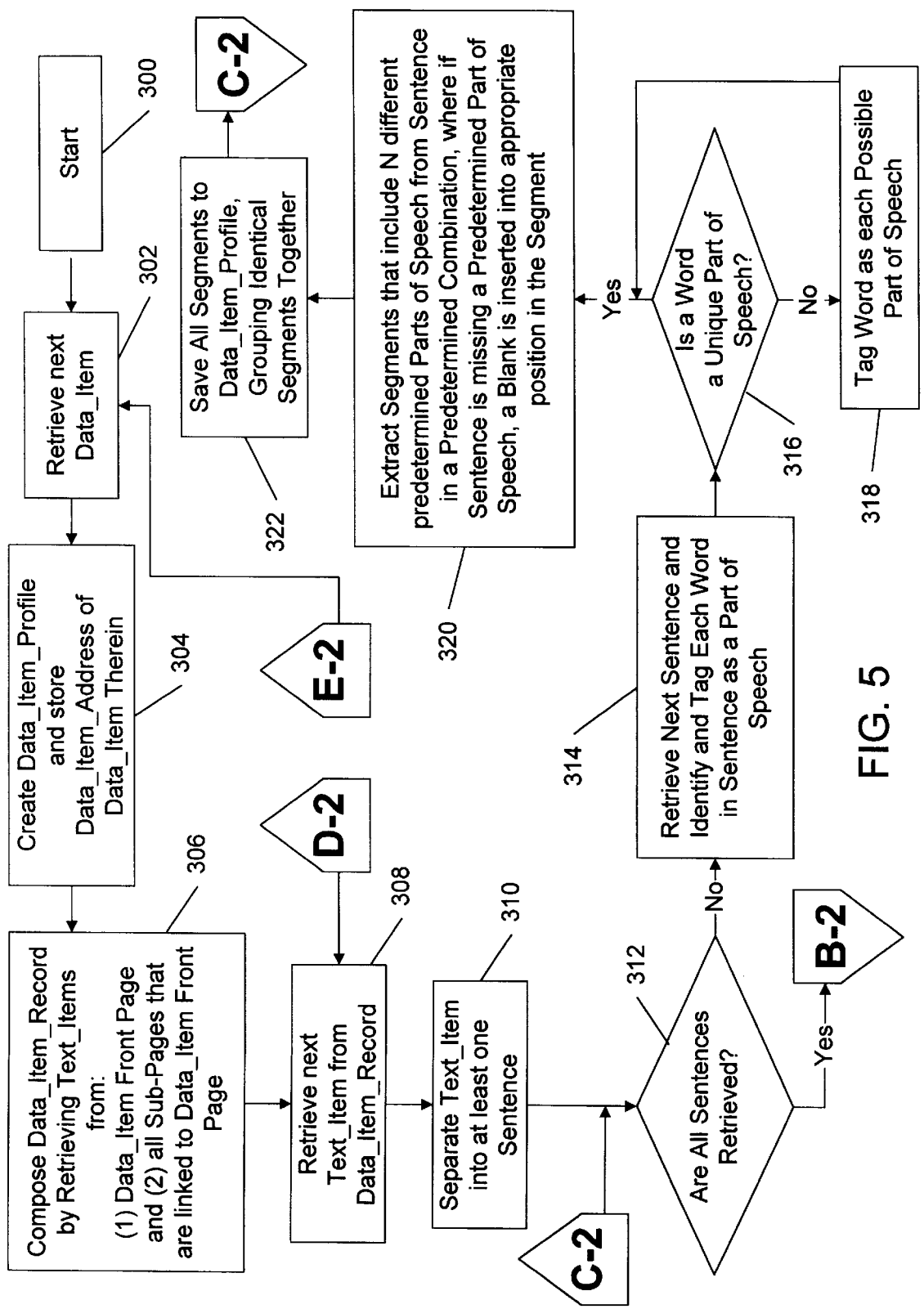
FIGS. 5 to 6 are logic flow diagrams representative of a data profile control program executed by the profiling/search system of FIG. 1 in accordance with the present invention.

Referring now to FIG. 5, a logic flow diagram representing a data profiling control program for the control unit 14 of FIG. 1 in accordance with a preferred embodiment of the present invention is shown. Data_Item refers to any document, whether flat text or hypertext, that may be a target during a potential data search by the user. Accordingly, Data_Items include all documents that are stored in the remote data storage system 32 on the remote computer system 30. For example, if the remote computer system 30 is the Internet, all web sites on all Internet 30 host computers as well as all documents stored on file transfer protocol (FTP) sites are Data_Items. The purpose of the data profiling control program is to generate Data_Item_Profile computer files representative of linguistic patterns of all Data_Items that may be subjected to a search by the user. In an alternate embodiment, if the profiling/search system 10 includes only the local computer system 12, Data_Items may include all documents stored in storage memory 18. Preferably, the data profiling control program is executed by the RCS control unit 34. However, in the alternate embodiment where the profiling/search system 10 includes only the local computer system 12, the data profiling control program is executed by the control unit 14.

The RCS control unit 34 begins the data profiling control program at a step 300 and proceeds to a step 302, where the RCS control unit 34 retrieves the first Data_Item from the remote data storage system 32. Preferably, to simplify the operation of the data profiling control program, prior to execution of the step 300, a list of the "addresses" of all Data_Items (hereinafter "Data_Item_Addresses") that are stored on the remote data storage system 32, is obtained from a typical indexing search engine. The address list enables the RSC control unit 34 to readily retrieve all Data_Items by sequentially following each address on the address list and retrieving the corresponding Data_Item. Indexing search engines, such as spiders or robots, which compile lists of addresses of all Internet documents/web sites are well known in the art and need not be described in detail herein. For example, there are companies that provide lists of all web sites on the Internet to various search engine providers. In should be noted that for the purpose on the present invention, indexing of the Data_Items in unnecessary—only a list of Data_Item_Addresses is required.

At a step 304, the RCS control unit 34 creates a Data_Item_Profile data file and stores the Data_Item_Address of the Data_Item retrieved at the step 302 therein. The Data_Item_Profile is preferably stored in a remote central profile database located in a profile storage device 36. At a step 306, the RCS control unit 34 composes a Data_Item_Record for the data item by retrieving all textual data, i.e. Text_Items from the Data_Item itself. If the Data_Item is a hypertext document (e.g. a web site) with hypertext links on the "front page" to additional documents, then the RCS control unit 34 also follows the links and retrieves, into the Data_Item_Record, all Text_Items that are linked to the front page. Thus, while a standard text Data_Item may contain only a single Text_Item, a hypertext Data_Item may contain a plurality of Text_Items.

At a step 308, the RCS control unit 34 retrieves the first Text_Item from the Data_Item_Record. At a step 310, the RCS control unit 34 separates the retrieved Text_Item into at least one separate "sentence"—a collection of words from which linguistic patterns will be extracted to form the Data_Item_Profile. As was noted before, most Text_Items are documents that consist of a plurality of typical grammatical sentences separated by EOS punctuation marks, such as periods, colons, and exclamation and question marks. Thus, the RCS control unit 34 can readily separate a typical Text_Item into a number of separate sentences by identifying each separate sentence as a set of words ending in an EOS punctuation mark.

Other Text_Items may not have any EOS punctuation marks and may be of significant length. Furthermore, certain compound sentences, such as patent claims, may contain multiple clauses and may also be of significant length. Preferably, a maximum sentence word count is defined as L as a matter of design choice. For example, L may be set to fifty words. The RCS control unit 34 analyzes the Text_Item and counts words until a EOS punctuation is reached; if the word count reaches L and an EOS punctuation mark is not reached, then the RCS control unit 34 identifies the L words as a sentence (i.e. as if an EOS punctuation mark was actually reached at L words) and begins a new word count for the next sentence. For example if the Text_Item is a 158 word patent claim, and L is set to fifty words, then this Text_Item will be separated into four sentences with fifty words in each of the first three sentences and eight words in the fourth sentence. If an EOS punctuation mark is reached before the word count reaches L, then the RCS control unit 34 identifies the words before the EOS punctuation mark as a sentence and begins a new word count for the next sentence.

Figure 6:
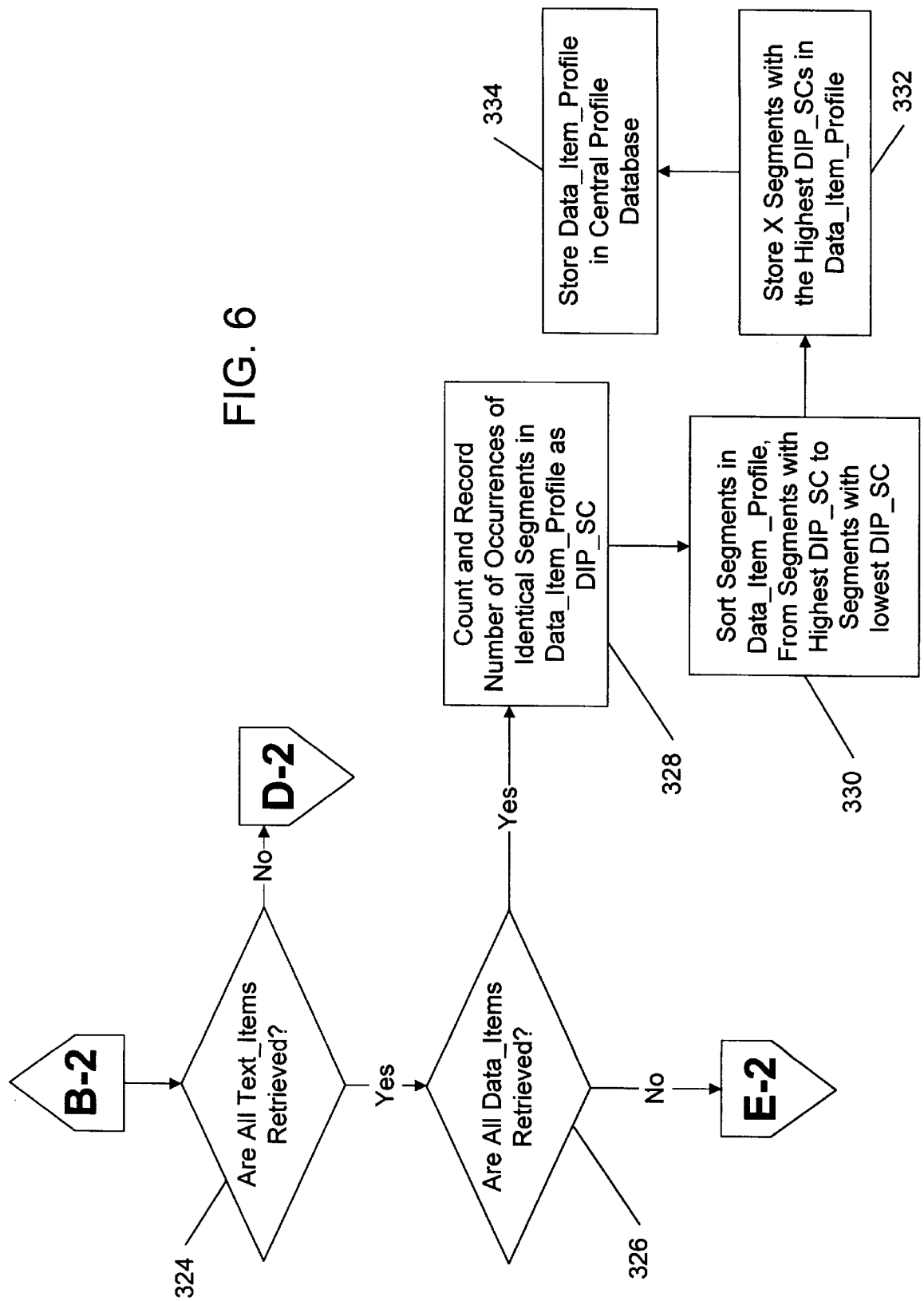

At a test 312, the RCS control unit 34 determines whether all sentences from the Text_Item retrieved at the step 308, have been retrieved. Because sentences are retrieved at a later step 314, during a first iteration of the test 312, where no sentences have been retrieved by the RCS control unit 34 thus far, the RCS control unit 34 proceeds directly to the step 314. During subsequent iterations, if all sentences have been retrieved from the current Text_Item, then the RCS control unit 34 proceeds to a test 324 (FIG. 6). If, on the other hand, not all sentences have been retrieved, then the RCS control unit 34 proceeds to the step 314.

At the step 314, the RCS control unit 34 retrieves the first sentence identified at the step 310 (or, during subsequent iteration of this step, retrieves the next sentence). The RCS control unit 34, then identifies and tags each word in the retrieved sentence as a particular part of speech (hereinafter "POS")—i.e. a noun, pronoun, verb, etc. To simplify further processing of the POS, after tagging the POS the RCS control unit 34 automatically brings all verbs to simple present tense, and brings all nouns to singular form. For example in a sentence "John walked to his beautiful home", the RCS control unit 34 would tag "John" and "home" as nouns, "walked" as a verb, "to" as a preposition, "his" as a pronoun, and "beautiful" as an adjective. However, since for the purpose of performing data searches only a few POS are necessary, the RCS control unit 34 preferably only identifies and tags certain predetermined POS such as nouns, verbs and adjectives.

This procedure is performed in accordance with standardized rules of grammar. Automatic identification of parts of speech in a sentence is well known in the art and need not be described herein. For example, man) conventional word processors unitize grammar checking functions that are capable if identifying parts of speech in a sentence. The particular POS that are identified and tagged by the RCS control unit 34 may include, but are not limited to: noun, pronoun, verb, adverb, adjective, gerund, propositions, conjunctions and interjections.

At a test 316, the RCS control unit 34 analyzes each word in the sentence and determines of it is a unique POS. Certain words may be used as different parts of speech, for example, the word "police" may be used both as a noun and as a verb. This determination may be done with reference to a dictionary stored in the remote data storage system 32. If the word is a unique POS, then the RCS control unit 34 proceeds to a step 320. Otherwise, if the word is not a unique POS, then the RCS control unit 34 proceeds to a step 318, where the RCS control unit 34 tags the word with multiple tags in accordance with its possible POS usage. For example, the word "police" would be tagged as a noun and as a verb.

At the step 320, the RCS control unit 34 extracts one or more segments from the sentence retrieved at the step 314 that are representative of the linguistic patterns of the sentence. A segment consists of one or more predetermined types of POS arranged in a predetermined order. The number, the type and the order of POS in a segment may be selected as a matter of design choice, depending on the purpose for which the Data__Item__Profile will be utilized. For the purpose of performing data searches, preferably each segment is a triad (i.e. N=3) of three POS arranged as follows: noun-verb-adjective. Thus, in accordance with this embodiment, previously, at the step 314, the RCS control unit 34 only identifies and tags nouns, verbs and adjectives, and at the step 320 the RCS control unit 34 extracts noun-verb-adjective segments from each sentence.

Alternately, the following other arrangements may be used for the segment if desired: noun-adverb-adjective; gerund-verb-adjective; gerund-adverb-adjective; pronoun-verb-adjective; pronoun-adverb-adjective. Accordingly, the appropriate POS used in the segment would need to have been previously tagged by the RCS control unit 34 at the step 314. Furthermore, in an alternate embodiment of the present invention, the segments may consist of one or more POS.

Because a sentence may contain multiple POS of the same type, i.e. two nouns, several segments may potentially be composed by the RCS control unit 34 from a single sentence. Thus, in accordance with the present invention, the RCS control unit 34 extracts every possible noun-verb-adjective segment from the sentence. For example, if the sentence is "Joe walked to his beautiful new house", then the RCS control unit 34 would extract the following segments therefrom:

Joe-walk-beautiful
Joe-walk-new
house-walk-beautiful
house-walk-new

However, if a particular sentence is missing one of the three POS (noun, verb, adjective) required in the segment, then the RCS control unit 34 inserts a "blank" flag (for example the characters "◇") into the position of the missing POS. For example, if the sentence is "Joe walked to his house", then the RCS control unit 34 would extract the following segments therefrom:

Joe-walk-◇
house-walk-◇

The blank flag "◇" was inserted by the RCS control unit 34 into the position of the adjective POS that was not present in the sentence.

At a step 322 the RCS control unit 34 temporarily stores all segments extracted at the step 320 in the Data__Item__Profile and then returns to the test 312.

Referring now to FIG. 6, at the test 324, the RCS control unit 34 determines if all Text__Items have been retrieved from Data__Item__Record. If all Text__Items have not been retrieved, then the RCS control unit 34 returns to the step 308 where the RCS control unit 34 retrieves the next Text__Item. Otherwise, if the RCS control unit 34 determines that all Text__Items have been retrieved from Data__Item__Record, then the RCS control unit 34 proceeds to a test 326. At the test 326, the RCS control unit 34 determines whether all Data__Items have been retrieved from the Data__Item__Address list. If all Data__Items have been retrieved, then the RCS control unit 34 proceeds to a step 328. If all Data__Items have not been retrieved, then the RCS control unit 34 returns to the step 302, where the RCS control unit 34 retrieves the next Data__Item.

Thus, in summary, during steps 302 to 326, the RCS control unit 34 sequentially retrieves Data__Items from a previously composed Data__Item__Address list, and for each Data__Item, the RCS control unit 34 retrieves all Text__Items from Data__Item__Record, splits each Text__Item into sentences, analyzes each sentence to extract segments representative of the sentence's linguistic patterns, and stores the extracted segments in Data__Item__Profile.

At the step 328, the RCS control unit 34 groups identical segments together into sets, counts the occurrence of identical segments in each set, and then records the number of identical segments in each set in Data__Item__Profile as Data__Item__Profile segment count (hereinafter "DIP__SC") next to each set of identical segments. For example, if the segment "science-advance-medical" appears twenty five times in Data__Item__Profile, the DIP__SC for that segment would be recorded next to that segment as "25". If the Data__Item__Profile already contains an identical segment set with an existing DIP__SC, then the DIP__SC determined at the step 328 is added to the existing DIP__SC. For example, if the Data__Item__Profile already contains the segment set "cure-develop-great" with DIP__SC of 15, and at the step 328 the RCS control unit 34 determines that five such segments were extracted from Data__Item__Record during the steps 302 to 324, then the RCS control unit 34 adds the new DIP__SC of 5 to the existing DIP__SC of 15 and records the new DIP__SC of 20 next to the segment set "cure-develop-great". A high DIP__SC for a segment is indicative of the relative importance of the segment as a representation of the Data__Item's linguistic pattern.

At a step 330, the RCS control unit 34 sorts the identical segment groups in the Data__Item__Profile from the identical segment group with the highest DIP__SC to the segment group with the lowest DIP__SC. Thus, after the step 330, the Data__Item__Profile may look as follows:

| Segment | DIP SC |
| --- | --- |
| science-advance-medical | 25 |
| cure-develop-great | 20 |
| : : : | : |
| police-follows-vigilant | 2 |

The number of different segment sets that may be stored in the Data__Item__Profile is practically limited only by the remote data storage system 32, and the computing capabilities of the RCS control unit 34. However, experimentation has shown that a very large number of segment sets in the Data__Item__Profile offers diminishing returns as balanced against the storage requirements for the Data__Item__Profile and the computing power required for the RCS control unit 34 in order to effectively work with the Data__Item__Profile. Thus, preferably only a certain amount of segment sets with the highest DIP__SC should be stored in the Data__Item__Profile. As a result, at a step 332, the RCS control unit 34 saves only X of the segments having the highest DIP__SCs to the Data__Item__Profile, deleting all the remaining segments. For example, X may be set to 5000, such that only 5000 of the most commonly occurring segments are saved by the RCS control unit 34 to the Data__Item__Profile. Alternatively, X% of the most commonly occurring segments may be saved to the Data__Item__Profile. For example, if X is set to 15, the RCS control unit 34 may save the top 15% of the segments with the highest UP__SCs. At a step 334, the RCS control unit 34 stores the Data__Item__Profile in the central profile database in the profile storage device 36.

Figure 7:
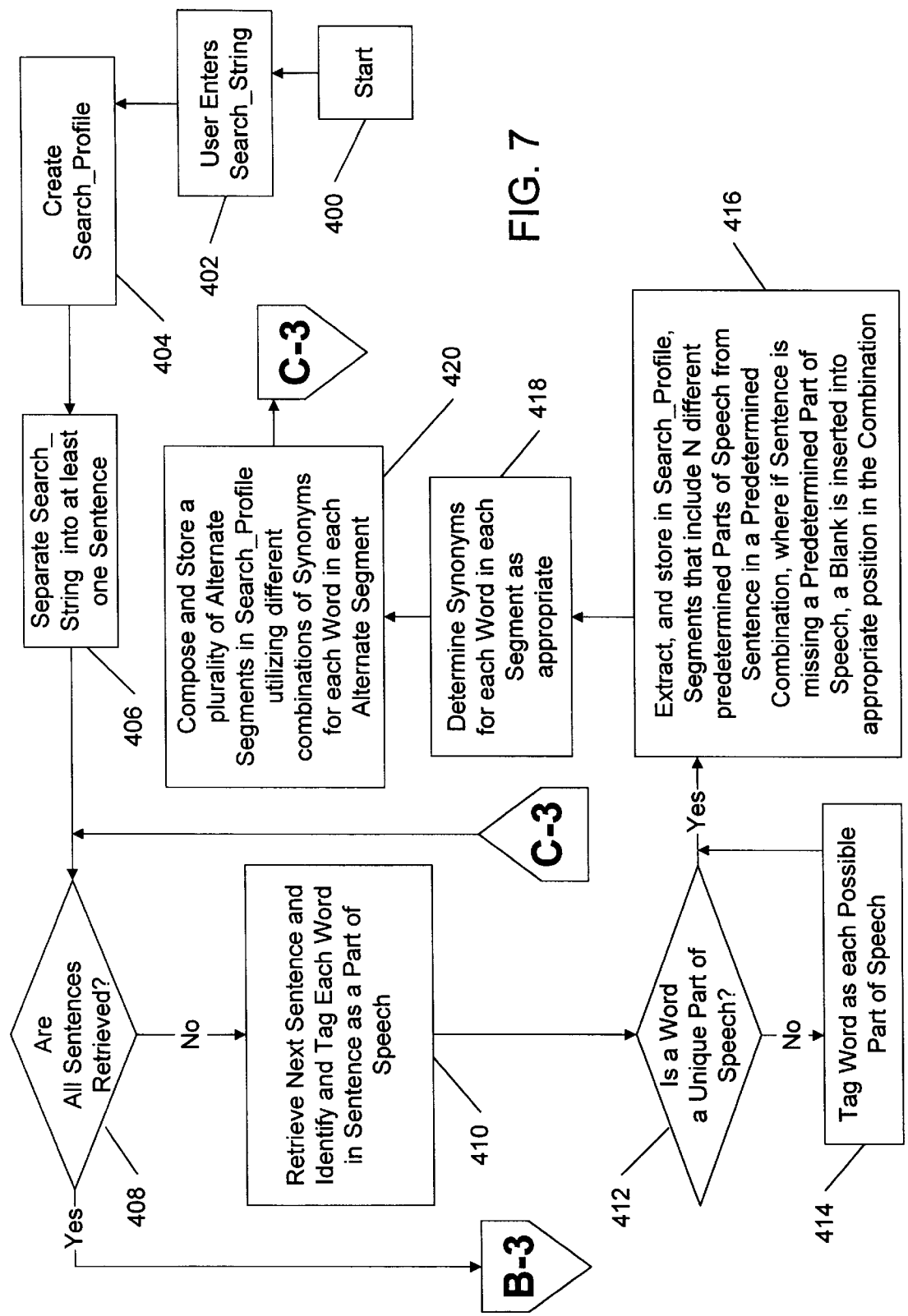
FIGS. 7 to 8 are logic flow diagrams representative of a data searching program executed by the profiling/search system of FIG. 1 in accordance with the present invention.

Referring now to FIG. 7, a logic flow diagram representing a data searching control program for the RCS control unit 34 of FIG. 1 in accordance with a preferred embodiment of the present invention is shown. In an alternate embodiment, a data searching control program may instead be executed by the control unit 14 of FIG. 1. The purpose of the data searching control program is to enable a user to utilize the profiling/searching system 10 to perform advanced searches for desired data files, such that the data files returned as search results correspond to the user's educational, cultural, social backgrounds and to the user's psychological profile. This is accomplished by ensuring that linguistic patterns of the data files presented to the user substantially correspond to the user's linguistic patterns. Typically, the data searching control program will be utilized by the user during a data browsing session, such as performed by the user at the step 110 (FIG. 1).

The RCS control unit 34 begins the data searching control program at a step 400 and proceeds to a step 402, where the user provides a Search_String consisting of a number of words representative of the subject matter of the data desired by the user and of any limiting information to further narrow the search, to the RCS control unit 34. The user may enter the Search_String manually by using the input device 20 such as a keyboard, or alternatively, the user may utilize a speech recognition input device 20 to enter the Search_String via vocalization.

At a step 404, the RCS control unit 34 creates a Search_Profile data file that, at the completion of steps 406 to 420, will be representative of the linguistic patterns of the Search_String. At a step 406, the RCS control unit 34 separates the Search_String into at least one separate "sentence"—a collection of words from which linguistic patterns will be extracted to form the Search_Profile. Most Search_Strings may not have any EOS punctuation marks and may be of significant length. Thus it may be difficult to isolate and identify individual sentences within the Search_String. Thus, preferably, a maximum sentence word count for the Search_String is defined as W as a matter of design choice. For example, W may be set to twenty words. The RCS control unit 34 analyzes the Search_String and counts words until a EOS punctuation is reached; if the word count reaches L and an EOS punctuation mark is not reached, then the RCS control unit 34 identifies the L words as a sentence (i.e. as if an EOS punctuation mark was actually reached at L words) and begins a new word count for the next sentence. For example if the Search_String is 65 words, and W is set to twenty words, then this Search_String will be separated into four sentences with twenty words in each of the first three sentences and five words in the fourth sentence. If an EOS punctuation mark is reached before the word count reaches W, then the RCS control unit 34 identifies the words before the EOS punctuation mark as a sentence and begins a new word count for the next sentence.

Figure 8:
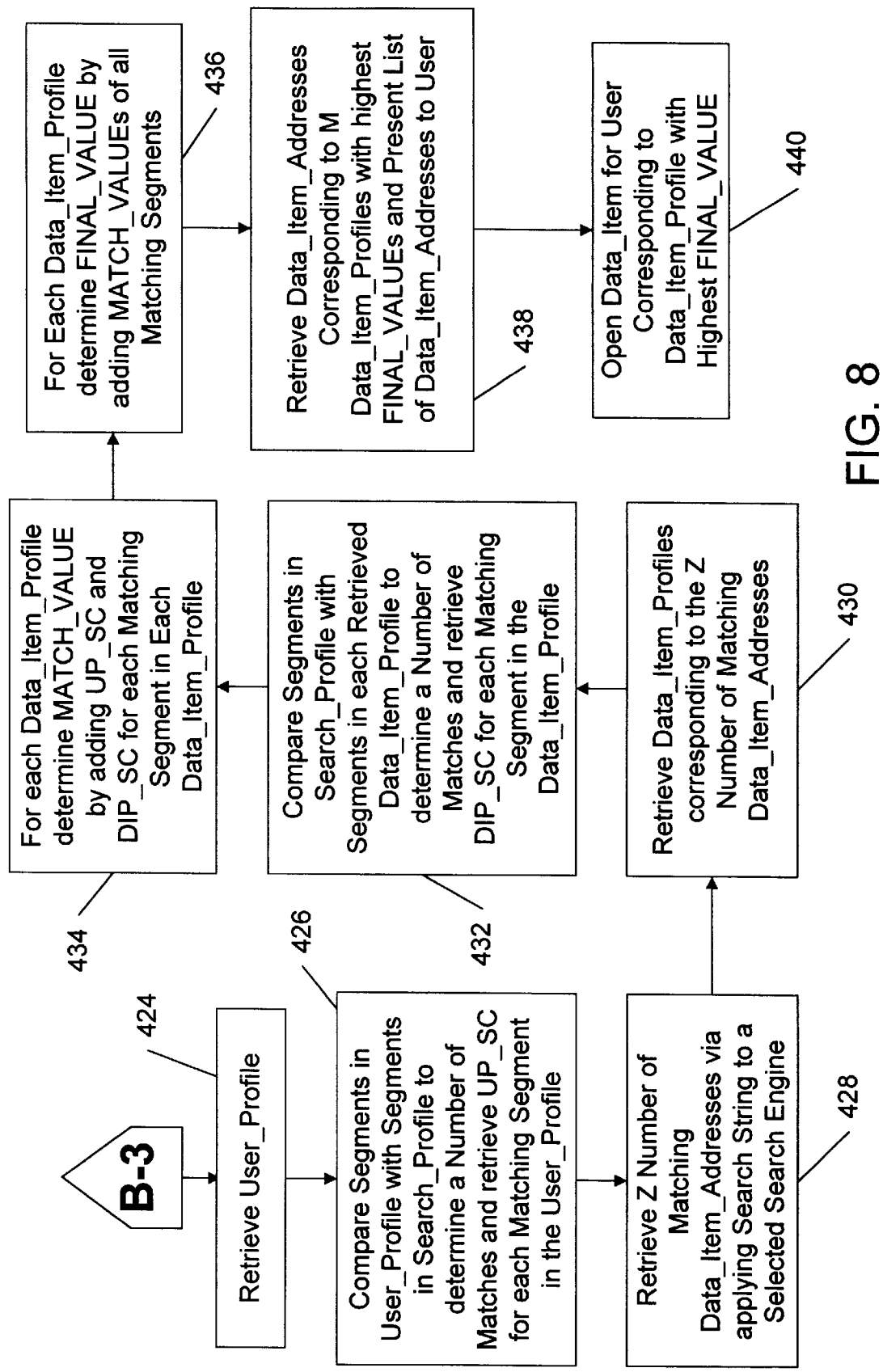

At a test 408, the RCS control unit 34 determines whether all sentences have been retrieved from the Search_String. Because sentences are retrieved at a later step 410, during a first iteration of the test 408, where no sentences have been retrieved by the RCS control unit 34 thus far, the RCS control unit 34 proceeds directly to the step 410. During subsequent iterations, if all sentences have been retrieved from the Search_String, then the RCS control unit 34 proceeds to a step 424 (FIG. 8). If, on the other hand, not all sentences have been retrieved, then the RCS control unit 34 proceeds to the step 410.

At the step 410, the RCS control unit 34 retrieves the first sentence identified at the step 406 (or, during subsequent iteration of this step, retrieves the next sentence). The RCS control unit 34, then identifies and tags each word in the retrieved sentence as a particular POS—i.e. a noun, pronoun, verb, etc. To simplify further processing of the POS, after tagging the POS the RSC control unit 34 automatically brings all verbs to simple present tense, and brings all nouns to singular form. For example in a sentence "Joe walked to his beautiful home", the RCS control unit 34 would tag "Joe" and "home" as nouns, "walk" as a verb, "to" as a preposition, "his" as a pronoun, and "beautiful" as an adjective. However, since for the purpose of performing data searches only a few POS are necessary, the RCS control unit 34 preferably only identifies and tags certain predetermined POS such as nouns, verbs and adjectives.

This procedure is performed in accordance with standardized rules of grammar. Automatic identification of parts of speech in a sentence is well known in the art and need not be described herein. For example, many conventional word processors unitize grammar checking functions that are capable if identifying parts of speech in a sentence. The particular POS that are identified and tagged by the RCS control unit 34 may include, but are not limited to: noun, pronoun, verb, adverb, adjective, gerund, propositions, conjunctions and interjections.

At a test 412, the RCS control unit 34 analyzes each word in the sentence and determines of it is a unique POS. Certain words may be used as different parts of speech, for example, the word "police" may be used both as a noun and as a verb. This determination may be done with reference to a dictionary stored in the remote data storage system 32. If the word is a unique POS, then the RCS control unit 34 proceeds to a step 416. Otherwise, if the word is not a unique POS, then the RCS control unit 34 proceeds to a step 414, where the RCS control unit 34 tags the word with multiple tags in accordance with its possible POS usage. For example, the word "police" would be tagged as a noun and as a verb.

At the step 416, the RCS control unit 34 extracts one or more segments from the sentence retrieved at the step 410 that are representative of the linguistic patterns of the sentence. A segment consists of one or more predetermined types of POS arranged in a predetermined order. The number, the type and the order of POS in a segment may be selected as a matter of design choice. For the purpose of performing data searches, preferably each segment is a triad (i.e. N=3) of three POS arranged as follows: noun-verb-adjective. Thus, in accordance with this embodiment, previously, at the step 410, the RCS control unit 34 only identifies and tags nouns, verbs and adjectives, and at the step 416 the RCS control unit 34 extracts noun-verb-adjective segments from each sentence.

Alternately, the following other arrangements may be used for the segment if desired: noun-adverb-adjective; gerund-verb-adjective; gerund-adverb-adjective; pronoun-verb-adjective; pronoun-adverb-adjective. Accordingly, the appropriate POS used in the segment would need to have been previously tagged by the RCS control unit 34 at the step 410. Furthermore, in an alternate embodiment of the present invention, the segments may consist of one or more POS. It should be noted that whatever selections were previously made for the segment arrangement (i.e. N, types of POS, positions of POS) for User_Profile (FIGS. 3–4) and the Data_Item Profiles (FIGS. 5–6), the same arrangement should be selected for the segments for the Search_Profile.

Because a sentence may contain multiple POS of the same type, i.e. two nouns, several segments may potentially be composed by the RCS control unit 34 from a single sentence. Thus, in accordance with the present invention, the RCS control unit 34 extracts every possible noun-verb-adjective segment from the sentence. For example, if the sentence is "computers run advanced expensive software", then the RCS control unit 34 would extract the following segments therefrom:

computer-run-advanced computer-run-expensive software-run-advanced software-run-expensive However, if a particular sentence is missing one of the three POS (noun, verb, adjective) required in the segment, then the RCS control unit 34 inserts a "blank" flag (for example the characters "◇") into the position of the missing POS. For example, if the sentence is "computers execute software", then the RCS control unit 34 would extract the following segments therefrom:

computer-execute-◇ software-execute-◇

The blank flag "◇" was inserted by the RCS control unit 34 into the position of the adjective POS that was not present in the sentence. The RCS control unit 34 then stores the extracted segments in the Search_Profile.

For increased accuracy in searching, particularly in the case where the Search_String is very small, optional steps 418 and 419 may be performed by the RCS control unit 34. At a step 418, the RCS control unit 34 determines synonyms for each word in each segment extracted at the step 416. For example, for the segment "computer-works-fast", the RCS control unit 34 determines the following synonyms for "computer": PC, calculator, mainframe, CPU, processor; the following synonyms for "work": operate, function, labor, accomplish; and the following synonyms for "fast": quick, speedy, rapid, swift, prompt. Automatic determination of synonyms is well known in the art, and is implemented as a thesaurus function in most word processing software programs.

At a step 420, the RCS control unit 34 composes a plurality of alternate segments for each segment stored in the Search_Profile utilizing different combinations of synonyms determined at the step 418. For example, for the segment "computer-works-fast", the RCS control unit 34 composes at least the following alternate segments:

PC-operate-quick

PC-function-rapid

CPU-operate-swift etc.

The RCS control unit 34 then stores the alternate segments in the Search_Profile and returns to the test 408.

Referring now to FIG. 8, at a step 424, the RCS control unit 34 retrieves the User_Profile of the user initiating the search at the step 400 from one of the local profile database and the central profile database. At a step 426, the RCS control unit 34 compares the segments stored in the User_Profile with the segments stored in the Search_Profile to determine a number of matches between various segments in each of the profiles and then retrieves the UP_SC for each of the matched segments from the User_Profile. For example, if the User_Profile contains the following segments, along with the UP_SCs in parentheses:

Joe-walk-beautiful (34),

Joe-walk-new (25), computer-execute-advanced (10), police-protect-watchful (8), man-walk-happy (7), computers-buy-expensive (3);

and the Search_Profile contained the following segments:

computer-execute-advanced, computer-buy-expensive, intelligence-compute-artificial;

then the RCS control unit 34 would determine two matches between the User_Profile and the Search_Profile— "computer-execute-advanced" and "computer-buy-expensive", and would retrieve the corresponding UP_SCs, 10 and 3, respectively.

At an optional step 428, the RCS control unit 34 applies the Search_String to a predetermined standard search engine to return and retrieve a list of Data_Item_Addresses of Z number of Data_Items that potentially match the user's search requirements. The step 438 is optional because the search procedures of the present invention, described in greater detail below in connection with steps 432 to 438, can be applied directly to all Data_Items stored on the remote data storage system 32, without first narrowing the list of Data_Items to be searched by using a standard search engine. However, given the processing capabilities of modern computers, a direct search of all Data_Items stored on the remote data storage system 32 using the principles of the present invention may be lengthy and therefore impractical. Thus, it may be preferable to utilize a standard search engine, such as for example, Alta Vista, to first return a smaller list of Z Data_Item_Addresses of Data_Items that directly match the Search_String provided by the user at the step 402.

The advantageous approach of the present invention, illustrated in steps 432 to 438, may then be applied to the smaller list of Data_Items to select and present to the user the particular Data_Items that not only directly respond to the user's expressed search request, but that also match the user's linguistic patterns and that therefore correspond to the user's cultural, educational, and psychological profile.

At an optional step 430, the RCS control unit 34 retrieves the Data_Item_Profiles corresponding to the Z Data_Item_Addresses retrieved at the step 428. This is readily accomplished by the RCS control unit 34 because each Data_Item_Profile contains the Data_Item_Address of the corresponding Data_Item from which the Data_Item_Profile was constructed.

At a step 432, the RCS control unit 34 compares the segments in the Search_Profile with the segments in each of the retrieved Data_Item_Profiles to determine and identify the matches between the segments in the Search_Profile and the segments in each of the Data_Item_Profiles. The RCS control unit 34 then retrieves the DIP_SC for each segment in each of the Data_Item_Profiles that matches a corresponding segment in the Searcher_Profile.

At a step 434, the RCS control unit 34 determines a MATCH_VALUE for each segment in each Data_Item_Profile that also appears in the User_Profile and in the Search_Profile, by adding the UP_SC of that segment to the DIP_SC of that segment. For example, if a particular segment appears 23 times in the User_Profile (UP_SC=23) and appears 5 times in the Data_Item_Profile (DIP_SC=5), then the match value of this segment in the Data_Item_Profile is 23+5 or 28.

At a step 436, the RCS control unit 34 determines a FINAL_VALUE for each Data_Item_Profile by adding the MATCH_VALUEs of all segments in the Data_Item_Profile that also appear in the User_Profile and in the Search_Profile. The FINAL_VALUE is representative of the degree to which the linguistic pattern of the Data_Item matches the linguistic pattern of the user in light of the linguistic pattern of the Search_String.

At a step 438, the RCS control unit 34 retrieves the Data_Item_Addresses corresponding to M Data_Item_

Profiles with the highest FINAL_VALUEs and presents a list of the M Data_Item_Addresses to the user in order of descending magnitude of their corresponding FINAL_VALUEs. The number M of the Data_Item_Addresses presented may be selected as a matter of design choice. For example, M may be set to 10 or 20. At an optional step 440, the RCS control unit 34 automatically retrieves and opens, for the user, the Data_Item corresponding to the Data_Item_Profile with the highest FINAL_VALUE.

Thus, while there have shown and described and pointed out fundamental novel features of the invention as applied to preferred embodiments thereof, it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

I claim:

1. A data processing method for enabling a user utilizing a local computer system having a local data storage system to locate desired data from a plurality of data items stored in a remote data storage system in a remote computer system, the remote computer system being linked to the local computer system by a telecommunication link, the method comprising the steps of:

(a) extracting, by one of the local computer system and the remote computer system, a user profile from user linguistic data previously provided by the user, said user data profile being representative of a first linguistic pattern of the said user linguistic data;

(b) constructing, by the remote computer system, a plurality of data item profiles, each plural data item profile corresponding to a different one of each plural data item stored in the remote data storage system, each of said plural data item profiles being representative of a second linguistic pattern of a corresponding plural data item, each said plural second linguistic pattern being substantially unique to each corresponding plural data item;

(c) providing, by the user to the local computer system, search request data representative of the user's expressed desire to locate data substantially pertaining to said search request data;

(d) extracting, by one of the local computer system and the remote computer system, a search request profile from said search request data, said search request profile being representative of a third linguistic pattern of said search request data;

(e) determining, by one of the local computer system and the remote computer system, a first similarity factor representative of a first correlation between said search request profile and said user profile by comparing said search request profile to said user profile;

(f) determining, by one of the local computer system and the remote computer system, a plurality of second similarity factors, each said plural second similarity factor being representative of a second correlation between said search request profile and a different one of said plural data item profiles, by comparing said search request profile to each of said plural data item profiles;

(g) calculating, by one of the local computer system and the remote computer system, a final match factor for each of said plural data item profiles, by adding said first similarity factor to at least one of said plural second similarity factors in accordance with at least one intersection between said first correlation and said second correlation;

(h) selecting, by one of the local computer system and the remote computer system, one of said plural data items corresponding to a plural data item profile having a highest final match factor; and (i) retrieving, by one of the local computer system and the remote computer system from the remote data storage system, said selected data item for display to the user, such that the user is presented with a data item having linguistic characteristics that substantially correspond to linguistic characteristics of the linguistic data generated by the user, whereby the linguistic characteristics of the data item correspond to the user's social, cultural, educational, economic background as well as to the user's psychological profile.

2. The method of claim 1, further comprising the step of:

(j) prior to said step (a), automatically adding, by one of the local computer system and the remote computer system, textual data generated by the user during utilization of the local computer system to said user linguistic data.

3. The method of claim 1, wherein said user linguistic data comprises at least one of: personal textual data generated by the user and favorite textual data generated by a source other than the user and that the user has adopted as being favorite.

4. The method of claim 1, wherein said user linguistic data comprises at least one text item, each said at least one text item comprising at least one sentence.

5. The method of claim 3, further comprising the step of:

(k) prior to said step (a), selecting, by the user at least one of said personal textual data and said favorite textual data, from textual data stored in one of the local data storage system and the remote data storage system.

6. The method of claim 1, further comprising the step of:

(l) prior to said step (a), determining, by one of the local computer system and the remote computer system, whether an existing user data profile is stored in one of the local data storage system and the remote data storage system, and:

1) when an existing user data profile is stored in one of the local data storage system and the remote data storage system, retrieving said existing user data profile and proceeding to said step (b); and 2) when an existing user data profile is not stored in one of the local data storage system and the remote data storage system, proceeding to said step (a).

7. The method of claim 4, wherein said step (a) comprises the steps of:

(m) generating, by one of the local computer system and the remote computer system, a user data profile;

(n) retrieving, by one of the local computer system and the remote computer system, a text item from said user linguistic data;

(o) separating, by one of the local computer system and the remote computer system, said text item into at least one sentence;

(p) extracting, from each of said at least one sentence, by one of the local computer system and the remote computer system, at least one segment representative of a linguistic pattern of each sentence of said at least one sentence;

(q) adding, by one of the local computer system and the remote computer system, at least one segment extracted at said step (p) to said user data profile;

(r) repeating, by one of the local computer system and the remote computer system, said steps (n) to (q) for each text item of said at least one text item in said user linguistic data;

(s) generating at least one user segment group, by one of the local computer system and the remote computer system, by grouping together identical segments of said at least one segment;

(t) determining a user segment count, by one of the local computer system and the remote computer system, for each user segment group of said at least one user segment group, each said user segment count being representative of a number of identical segments in the corresponding user segment group of said at least one user segment group, and linking each said user segment count to the corresponding user segment group of said at least one user segment group;

(u) sorting the user segment groups of said at least one user segment group, by one of the local computer system and the remote computer system, in an descending order of user segment counts starting from a user segment group having a highest user segment count, and recording said user segment groups and corresponding user segment counts in said user data profile; and (v) storing, by one of the local computer system and the remote computer system, said user data profile, representative of said first linguistic pattern, in at least one of the local data storage system and the remote data storage system.

8. The method of claim 7, wherein said step (o) comprises the step of:

(w) determining a word count by sequentially counting words of said text item;

(x) when an end of sentence mark is reached before said word count reaches a predefined word limit, storing said counted words as a sentence, restarting said word count, and repeating said step (w) starting after a last word of said stored sentence; and (y) when said word count reaches said predefined word limit, storing said counted words as a sentence, restarting said word count, and repeating said step (w) starting after a last word of said stored sentence.

9. The method of claim 8, wherein said end of sentence mark comprises one of: a period, an exclamation mark, and a question mark.

10. The method of claim 7, wherein said step (p) comprises the steps, performed for each sentence of said at least one sentence, of:

(z) identifying and tagging each word in a sentence as one of a predetermined plurality of different parts of speech; and (aa) arranging a predetermined number of said tagged words in a predetermined order of said predetermined plural different parts of speech to compose at least one segment for each possible combination of said predetermined number of said tagged words arranged in said predetermined order, said at least one segment being representative of a linguistic pattern of said sentence.

11. The method of claim 10, further comprising the step of:

(bb) after said step (z), determining whether each word may serve as an additional part of speech, and when a word may serve as an additional part of speech, adding an additional tag to said word to identify said word as said additional part of speech.

12. The method of claim 10, wherein said predetermined plurality of different parts of speech comprises at least one of: noun, pronoun, verb, adverb, adjective, gerund, proposition, conjunction and interjection.

13. The method of claim 10, wherein said predetermined plurality of different parts of speech comprises a noun, a verb and an adjective, wherein said predetermined number is three, and wherein said predetermined order is noun, verb, adjective.

14. The method of claim 10, wherein said step (aa) further comprises the step of:

(cc) when one of said predetermined plural different parts of speech is missing from said sentence, inserting a blank mark into said segment instead of said missing predetermined part of speech.

15. The method of claim 7, wherein said step (v) further comprises the step of:

(dd) encrypting said user data profile such that said encrypted user data profile may only be utilized when an authorization is received from the user.

16. The method of claim 7, wherein said step (u) further comprises the step of:

(ee) recording, in said user data profile, only a first predetermined portion of said at least one user segment groups having highest user segment counts.

17. The method of claim 16, wherein said first predetermined portion comprises one of: 5,000 user segment groups and a top five percent of said at least one user segment groups.

18. The method of claim 7, wherein said step (b) further comprises a step of:

(ff) for each plural data item, generating a data item record comprising at least one text item from the data item, each said at least one text item comprising at least one sentence.

19. The method of claim 18, wherein one of said at least one text items is a primary text item, and wherein said primary text item comprises at least one hyperlink to at least one additional text item, such that when said at least one hyperlink is activated, said at least one additional text item is thereby retrieved, further comprising the step of:

(gg) retrieving, by the remote computer system, said at least one additional text item into said data item record.

20. The method of claim 18, wherein said step (b) comprises the steps, performed for each plural data item, of:

(hh) generating, by the remote computer system, a data item profile, said data item profile comprising a data item address representative of a location of said data item in the remote data storage system, such that said data item may be retrieved by providing said data item address to said remote computer system;

(ii) retrieving, by the remote computer system, a text item from said data item record;

(jj) separating, by the remote computer system, said text item into at least one sentence;

(kk) extracting, from each of said at least one sentence, by the remote computer system, at least one segment representative of a linguistic pattern of each sentence of said at least one sentence;

(ll) adding, by the remote computer system, at least one segment extracted at said step (kk) to said data item profile;

(mm) repeating, by the remote computer system, said steps (ii) to (ll) for each text item of said at least one text item in said data item record;

(nn) generating at least one data segment group, by the remote computer system, by grouping together identical segments of said at least one segment;

(oo) determining a data item segment count, by the remote computer system, for each data segment group of said at least one data segment group, each said data item segment count being representative of a number of identical segments in the corresponding data segment group of said at least one data segment group, and linking each said data item segment count to the corresponding data segment group of said at least one data segment group;

(pp) sorting the data segment groups of said at least one data segment group, by the remote computer system, in an descending order of data item segment counts starting from a data segment group having a highest data item segment count, and recording said data segment groups and corresponding data item segment counts in said data item profile; and (qq) storing, by the remote computer system, said data item profile, representative of one of said plural second linguistic patterns, in the remote data storage system.

21. The method of claim 20, wherein said step (jj) comprises the step of:

(rr) determining a word count by sequentially counting words of said text item;

(ss) when an end of sentence mark is reached before said word count reaches a predefined word limit, storing said counted words as a sentence, restarting said word count, and repeating said step (rr) starting after a last word of said stored sentence; and (tt) when said word count reaches said predefined word limit, storing said counted words as a sentence, restarting said word count, and repeating said step (rr) starting after a last word of said stored sentence.

22. The method of claim 21, wherein said end of sentence mark comprises one of: a period, an exclamation mark, and a question mark.

23. The method of claim 20, wherein said step (kk) comprises the steps, performed for each sentence of said at least one sentence, of:

(uu) identifying and tagging each word in a sentence as one of said predetermined plurality of different parts of speech; and (vv) arranging a predetermined number of said tagged words in a predetermined order of said predetermined plural different parts of speech to compose at least one segment for each possible combination of said predetermined number of said tagged words arranged in said predetermined order, said at least one segment being representative of a linguistic pattern of said sentence.

24. The method of claim 23, further comprising the step of:

(ww) after said step (uu), determining whether each word may serve as an additional part of speech, and when a word may serve as an additional part of speech, adding an additional tag to said word to identify said word as said additional part of speech.

25. The method of claim 23, wherein said predetermined plurality of different parts of speech comprises at least one of: noun, pronoun, verb, adverb, adjective, gerund, proposition, conjunction and interjection.

26. The method of claim 23, wherein said predetermined plurality of different parts of speech comprises a noun, a verb and an adjective, wherein said predetermined number is three, and wherein said predetermined order is noun, verb, adjective.

27. The method of claim 23, wherein said step (vv) further comprises the step of:

(xx) when one of said predetermined plural different parts of speech is missing from said sentence, inserting a blank mark into said segment instead of said missing predetermined part of speech.

28. The method of claim 20, wherein said step (pp) further comprises the step of:

(yy) recording, in said data item profile, only a second predetermined portion of said at least one data segment groups having highest data item segment counts.

29. The method of claim 28, wherein said second predetermined portion comprises one of: 5,000 data segment groups and a top five percent of said at least one data segment groups.

30. The method of claim 20, wherein said step (d) comprises the steps of:

(zz) generating, by one of the local computer system and the remote computer system, a search profile;

(aaa) separating, by one of the local computer system and the remote computer system, said search request data into at least one sentence;

(bbb) extracting, from each of said at least one sentence, by one of the local computer system and the remote computer system, at least one search segment representative of a linguistic pattern of each sentence of said at least one sentence; and (ccc) adding, by one of the local computer system and the remote computer system, at least one search segment extracted at said step (bbb) to said search profile, said search profile being representative of said third linguistic pattern of said search request data.

31. The method of claim 30, wherein said step (aaa) comprises the step of:

(ddd) determining a word count by sequentially counting words of said search request data;

(eee) when an end of sentence mark is reached before said word count reaches a predefined word limit, storing said counted words as a sentence, restarting said word count, and repeating said step (ddd) starting after a last word of said stored sentence; and (fff) when said word count reaches said predefined word limit, storing said counted words as a sentence, restarting said word count, and repeating said step (ddd) starting after a last word of said stored sentence.

32. The method of claim 31, wherein said end of sentence mark comprises one of: a period, an exclamation mark, and a question mark.

33. The method of claim 30, wherein said step (bbb) comprises the steps, performed for each sentence of said at least one sentence, of:

(ggg) identifying and tagging each word in a sentence as one of said predetermined plurality of different parts of speech; and (hhh) arranging a predetermined number of said tagged words in a predetermined order of said predetermined plural different parts of speech to compose at least one segment for each possible combination of said predetermined number of said tagged words arranged in said predetermined order, said at least one segment being representative of a linguistic pattern of said sentence.

34. The method of claim 33, further comprising the step of:
  (iii) after said step (ggg), determining whether each word may serve as an additional part of speech, and when a word may serve as an additional part of speech, adding an additional tag to said word to identify said word as said additional part of speech.

35. The method of claim 33, wherein said predetermined plurality of different parts of speech comprises at least one of: noun, pronoun, verb, adverb, adjective, gerund, proposition, conjunction and interjection.

36. The method of claim 33, wherein said predetermined plurality of different parts of speech comprises a noun, a verb and an adjective, wherein said predetermined number is three, and wherein said predetermined order is noun, verb, adjective.

37. The method of claim 33, wherein said step (hhh) further comprises the step of:
  (jjj) when one of said predetermined plural different parts of speech is missing from said sentence, inserting a blank mark into said segment instead of said missing predetermined part of speech.

38. The method of claim 33, further comprising the steps of:
  (kkk) determining, by one of the local computer system and the remote computer system, at least one synonym for each word in each segment;
  (lll) composing, by one of the local computer system and the remote computer system, a plurality of alternate search segments for each segment utilizing said synonyms, wherein said alternate search segments are composed in accordance with said predetermined order of said predetermined plural different parts of speech; and
  (mmm) recording, by one of the local computer system and the remote computer system, said plural alternate search segments in said search profile.

39. The method of claim 30, wherein said step (e) comprises the steps of:
  (nnn) retrieving, by one of the local computer system and the remote computer system, said user data profile from one of the local data storage system and the remote data storage system; and
  (ooo) comparing, by one of the local computer system and the remote computer system, said at least one user segment group to said at least one search segment, and recording said user segment counts of each user segment group of said at least one user segment group that matches a corresponding search segment of said at least one search segment, said user segment counts being representative of said first similarity factor.

40. The method of claim 39, wherein said step (f) comprises the steps of:
  (ppp) for each plural data item, retrieving, by one of the local computer system and the remote computer system, a corresponding data item profile from the remote data storage system; and
  (qqq) for each plural data item profile, comparing, by one of the local computer system and the remote computer system, said at least one data segment group to said at least one search segment, and recording said data segment counts of each data segment group of said at least one data segment group that matches a corresponding search segment of said at least one search segment, said data segment counts being representative of said plural second similarity factor.

41. The method of claim 40, wherein said step (g) comprises the steps of:
  (rrr) for each said plural data item profile, determining a least one match value, by one of the local computer system and the remote computer system, by first identifying a data segment group in the plural data item profile that matches both a corresponding search segment and a corresponding user segment group and then adding said user segment count of said corresponding user segment group to said data segment count of said identified data segment group, wherein when no matches are identified, said at least one match value is set to null; and
  (sss) for each said plural data item profile, determining a final match factor, by one of the local computer system and the remote computer system, by adding together all said at least one match values determined for said plural data item profile at said step (rrr).

42. The method of claim 40, wherein said step (ppp) comprises the steps of:
  (ttt) applying, by the remote computer system, said search request data to a conventional data search engine, implemented in the remote computer system, to return a list of at least one data item address of at least one preliminary matching data item that potentially corresponds to said search request data; and
  (uuu) retrieving from the remote storage system, by one of the local computer system and the remote computer system, at least one data item profile corresponding to said at least one preliminary matching data item in said list.

43. The method of claim 1, wherein said step (h) comprises the steps of:
  (vvv) selecting, by one of the local computer system and the remote computer system, a portion of said plural data items corresponding to a predetermined number of plural data item profiles having highest final match factors; and
  wherein said step (i) comprises the step of:
    (www) retrieving, by one of the local computer system and the remote computer system from the remote data storage system, said selected data items for display to the user, such that the user is presented with a group of data items having linguistic characteristics that substantially correspond to linguistic characteristics of the linguistic data generated by the user, whereby the linguistic characteristics of the data items correspond to the user's social, cultural, educational, economic background as well as to the user's psychological profile.

44. A data processing method for enabling a user, utilizing a computer system having a data storage system, to locate desired data from a plurality of data items stored in the data storage system, the method comprising the steps of:
  (a) extracting, by the local computer system, a user profile from user linguistic data previously provided by the user, said user data profile being representative of a first linguistic pattern of the said user linguistic data;
  (b) constructing, by the computer system, a plurality of data item profiles, each plural data item profile corresponding to a different one of each plural data item stored in the data storage system, each of said plural data item profiles being representative of a second linguistic pattern of a corresponding plural data item, each said plural second linguistic pattern being substantially unique to each corresponding plural data item;

(c) providing, by the user to the computer system, search request data representative of the user's expressed desire to locate data substantially pertaining to said search request data;

(d) extracting, by the computer system, a search request profile from said search request data, said search request profile being representative of a third linguistic pattern of said search request data;

(e) determining, by the computer system, a first similarity factor representative of a first correlation between said search request profile and said user profile by comparing said search request profile to said user profile;

(f) determining, by the computer system, a plurality of second similarity factors, each said plural second similarity factor being representative of a second correlation between said search request profile and a different one of said plural data item profiles, by comparing said search request profile to each of said plural data item profiles;

(g) calculating, by the computer system, a final match factor for each of said plural data item profiles, by adding said first similarity factor to at least one of said plural second similarity factors in accordance with at least one intersection between said first correlation and said second correlation;

(h) selecting, by the computer system, one of said plural data items corresponding to a plural data item profile having a highest final match factor; and (i) retrieving, by the computer system from the data storage system, said selected data item for display to the user, such that the user is presented with a data item having linguistic characteristics that substantially correspond to linguistic characteristics of the linguistic data generated by the user, whereby the linguistic characteristics of the data item correspond to the user's social, cultural, educational, economic background as well as to the user's psychological profile.

45. A data processing method for generating a user data profile representative of a user's social, cultural, educational, economic background and of the user's psychological profile, the method being implemented in a computer system having a storage system, comprising the steps of:

(a) retrieving, by the computer system, user linguistic data previously provided by the user, said user linguistic data comprising at least one text item, each said at least one text item comprising at least one sentence;

(b) generating, by the computer system, an empty user data profile;

(c) retrieving, by the computer system, a text item from said user linguistic data;

(d) separating, by the computer system, said text item into at least one sentence;

(e) extracting, from each of said at least one sentence, by the computer system, at least one segment representative of a linguistic pattern of each sentence of said at least one sentence;

(f) adding, by the computer system, at least one segment extracted at said step (e) to said user data profile;

(g) repeating, by the computer system, said steps (c) to (f) for each text item of said at least one text item in said user linguistic data;

(h) generating at least one user segment group, by the computer system, by grouping together identical segments of said at least one segment;

(i) determining a user segment count, by the computer system, for each user segment group of said at least one user segment group, each said user segment count being representative of a number of identical segments in the corresponding user segment group of said at least one user segment group, and linking each said user segment count to the corresponding user segment group of said at least one user segment group;

(j) sorting the user segment groups of said at least one user segment group, by the computer system, in an descending order of user segment counts starting from a user segment group having a highest user segment count, and recording said user segment groups and corresponding user segment counts in said user data profile; and (k) storing, by the computer system, said user data profile, representative of an overall linguistic pattern of the user, in the data storage system, said overall linguistic pattern substantially corresponding to the user's social, cultural, educational, economic background and to the user's psychological profile.

46. The method of claim 45, further comprising the step of:

(l) prior to said step (a), automatically adding, by the computer system, textual data generated by the user during utilization of the computer system to said user linguistic data.

47. The method of claim 45, wherein said user linguistic data comprises at least one of: personal textual data generated by the user and favorite textual data generated by a source other than the user and that the user has adopted as being favorite.

48. The method of claim 47, further comprising the step of:

(m) prior to said step (a), selecting, by the user at least one of said personal textual data and said favorite textual data, from textual data stored in the data storage system.

49. The method of claim 45, wherein said step (d) comprises the step of:

(n) determining a word count by sequentially counting words of said text item;

(o) when an end of sentence mark is reached before said word count reaches a predefined word limit, storing said counted words as a sentence, restarting said word count, and repeating said step (n) starting after a last word of said stored sentence; and (p) when said word count reaches said predefined word limit, storing said counted words as a sentence, restarting said word count, and repeating said step (n) starting after a last word of said stored sentence.

50. The method of claim 49, wherein said end of sentence mark comprises one of: a period, an exclamation mark, and a question mark.

51. The method of claim 45, wherein said step (e) comprises the steps, performed for each sentence of said at least one sentence, of:

(q) identifying and tagging each word in a sentence as one of a predetermined plurality of different parts of speech; and (r) arranging a predetermined number of said tagged words in a predetermined order of said predetermined plural different parts of speech to compose at least one segment for each possible combination of said predetermined number of said tagged words arranged in said predetermined order, said at least one segment being representative of a linguistic pattern of said sentence.

52. The method of claim 51, further comprising the step of:
(s) after said step (q), determining whether each word may serve as an additional part of speech, and when a word may serve as an additional part of speech, adding an additional tag to said word to identify said word as said additional part of speech.

53. The method of claim 51, wherein said predetermined plurality of different parts of speech comprises at least one of: noun, pronoun, verb, adverb, adjective, gerund, proposition, conjunction and interjection.

54. The method of claim 51, wherein said predetermined plurality of different parts of speech comprises a noun, a verb and an adjective, wherein said predetermined number is three, and wherein said predetermined order is noun, verb, adjective.

55. The method of claim 51, wherein said step (r) further comprises the step of:
(t) when one of said predetermined plural different parts of speech is missing from said sentence, inserting a blank mark into said segment instead of said missing predetermined part of speech.

56. The method of claim 45, wherein said step (k) further comprises the step of:
(u) encrypting said user data profile such that said encrypted user data profile may only be utilized when an authorization is received from the user.

57. The method of claim 45, wherein said step (j) further comprises the step of:
(v) recording, in said user data profile, only a first predetermined portion of said at least one user segment groups having highest user segment counts.

58. The method of claim 57, wherein said first predetermined portion comprises one of: 5,000 user segment groups and a top five percent of said at least one user segment groups.

59. A data processing system, comprising a local computer system having a local data storage system, and a remote computer system having a remote data storage, the remote computer system being linked to the local computer system by a telecommunication link, for enabling a user of the local computer system to locate desired data from a plurality of data items stored in the remote data storage system, the data processing system comprising:
first extracting means, in one of the local computer system and the remote computer system, for extracting a user profile from user linguistic data previously provided by the user, said user data profile being representative of a first linguistic pattern of the said user linguistic data;
first control means, in one of the local computer system and the remote computer system, for constructing a plurality of data item profiles, each plural data item profile corresponding to a different one of each plural data item stored in the remote data storage system, each of said plural data item profiles being representative of a second linguistic pattern of a corresponding plural data item, each said plural second linguistic pattern being substantially unique to each corresponding plural data item;
first input means, in the local computer system, for acquiring search request data from the user, said search request data being representative of the user's expressed desire to locate data in the remote storage system substantially pertaining to said search request data;
second extracting means, in one of the local computer system and the remote computer system, connected to said first input means, for extracting a search request profile from said acquired search request data, said search request profile being representative of a third linguistic pattern of said search request data;
second control means, in one of the local computer system and the remote computer system, connected to said first extracting means and said second extracting means, for determining a first similarity factor representative of a first correlation between said search request profile and said user profile by comparing said search request profile to said user profile;
third control means, in one of the local computer system and the remote computer system, connected to said first control means and said second extracting means, for determining a plurality of second similarity factors, each said plural second similarity factor being representative of a second correlation between said search request profile and a different one of said plural data item profiles, by comparing said search request profile to each of said plural data item profiles;
fourth control means, in one of the local computer system and the remote computer system, connected to said second an said third control means, for calculating a final match factor for each of said plural data item profiles, by adding said first similarity factor to at least one of said plural second similarity factors in accordance with at least one intersection between said first correlation and said second correlation;
first selection means, in one of the local computer system and the remote computer system, connected to said fourth control means, for selecting one of said plural data items corresponding to a plural data item profile having a highest final match factor; and
first retrieving means, in one of the local computer system and the remote computer system, connected to said first selection means, for retrieving, from the remote data storage system, said selected data item for display to the user, such that the user is presented with a data item having linguistic characteristics that substantially correspond to linguistic characteristics of the linguistic data generated by the user, whereby the linguistic characteristics of the data item correspond to the user's social, cultural, educational, economic background as well as to the user's psychological profile.

60. A data processing system, comprising a computer system having a data storage system, for enabling a user of the computer system to locate desired data from a plurality of data items stored in the data storage system, the data processing system comprising:
first extracting means for extracting a user profile from user linguistic data previously provided by the user, said user data profile being representative of a first linguistic pattern of the said user linguistic data;
first control means for constructing a plurality of data item profiles, each plural data item profile corresponding to a different one of each plural data item stored in the data storage system, each of said plural data item profiles being representative of a second linguistic pattern of a corresponding plural data item, each said plural second linguistic pattern being substantially unique to each corresponding plural data item;
first input means for acquiring search request data from the user, said search request data being representative of the user's expressed desire to locate data in the storage system substantially pertaining to said search request data;

second extracting means, connected to said first input means, for extracting a search request profile from said acquired search request data, said search request profile being representative of a third linguistic pattern of said search request data;

second control means, connected to said first extracting means and said second extracting means, for determining a first similarity factor representative of a first correlation between said search request profile and said user profile by comparing said search request profile to said user profile;

third control means, connected to said first control means and said second extracting means, for determining a plurality of second similarity factors, each said plural second similarity factor being representative of a second correlation between said search request profile and a different one of said plural data item profiles, by comparing said search request profile to each of said plural data item profiles;

fourth control means, connected to said second an said third control means, for calculating a final match factor for each of said plural data item profiles, by adding said first similarity factor to at least one of said plural second similarity factors in accordance with at least one intersection between said first correlation and said second correlation;

first selection means, connected to said fourth control means, for selecting one of said plural data items corresponding to a plural data item profile having a highest final match factor; and first retrieving means, connected to said first selection means, for retrieving, from the data storage system, said selected data item for display to the user, such that the user is presented with a data item having linguistic characteristics that substantially correspond to linguistic characteristics of the linguistic data generated by the user, whereby the linguistic characteristics of the data item correspond to the user's social, cultural, educational, economic background as well as to the user's psychological profile.

61. The method of claim 1, wherein the remote computer system comprises a plurality of computer systems connected to the Internet and the World Wide Web.

62. The system of claim 59, wherein the remote computer system comprises a plurality of computer systems connected to the Internet and the World Wide Web.

* * * * *